(12) United States Patent
Bocharov et al.

(10) Patent No.: US 9,514,415 B2
(45) Date of Patent: Dec. 6, 2016

(54) METHOD AND SYSTEM FOR DECOMPOSING SINGLE-QUBIT QUANTUM CIRCUITS INTO A DISCRETE BASIS

(71) Applicant: Microsoft Corporation, Redmond, WA (US)

(72) Inventors: Alexei V. Bocharov, Redmond, WA (US); Yuri Gurevich, Redmond, WA (US); Krysta M. Svore, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 263 days.

(21) Appl. No.: 14/018,319

(22) Filed: Sep. 4, 2013

(65) Prior Publication Data

US 2014/0280427 A1 Sep. 18, 2014

Related U.S. Application Data

(60) Provisional application No. 61/800,033, filed on Mar. 15, 2013.

(51) Int. Cl.
| | | |
|---|---|---|
| *G06F 17/00* | (2006.01) | |
| *G06N 99/00* | (2010.01) | |
| *B82Y 10/00* | (2011.01) | |

(52) U.S. Cl.
CPC ............. *G06N 99/002* (2013.01); *B82Y 10/00* (2013.01)

(58) Field of Classification Search
None
See application file for complete search history.

(56) References Cited

U.S. PATENT DOCUMENTS

| | | |
|---|---|---|
| 6,578,018 B1 | 6/2003 | Ulyanov |
| 7,018,852 B2 | 3/2006 | Wu et al. |
| 7,133,888 B2 * | 11/2006 | Kohn .................... G06N 99/002 |
| | | 708/446 |
| 7,788,192 B2 | 8/2010 | Amin |
| 7,858,966 B2 | 12/2010 | Kitaev |

(Continued)

OTHER PUBLICATIONS

Abdollahi et al, "Analysis and Synthesis of Quantum Circuits by Using Quantum Decision Diagrams", Proc Design, Automation and Test in Europe, Mar. 2006, 6 pgs.

(Continued)

*Primary Examiner* — David H Malzahn
(74) *Attorney, Agent, or Firm* — Steve Wight; Sandy Swain; Micky Minhas

(57) ABSTRACT

A target quantum circuit expressed in a first quantum gate basis may be transformed into a corresponding quantum circuit expressed in a second quantum gate basis, which may be a universal set of gates such as a V gate basis set. The target quantum circuit may be expressed as a linear combination of quantum gates. The linear combination of quantum gates may be mapped to a quaternion. The quaternion may be factorized, based at least in part on an amount of precision between the target quantum circuit and the corresponding quantum circuit expressed in the second quantum gate basis, into a sequence of quaternion factors. The sequence of quaternion factors may be mapped into a sequence of quantum gates of the second quantum gate basis, where the sequence of sequence of quantum gates is the corresponding quantum circuit.

20 Claims, 9 Drawing Sheets

(56) References Cited

U.S. PATENT DOCUMENTS

| | | | |
|---|---|---|---|
| 8,190,553 | B2 | 5/2012 | Routt |
| 8,386,899 | B2* | 2/2013 | Goto ............... B82Y 10/00 712/1 |
| 8,620,835 | B2* | 12/2013 | Freedman ......... B82Y 10/00 706/12 |
| 2004/0238813 | A1* | 12/2004 | Lidar ............... B82Y 10/00 257/31 |
| 2005/0015422 | A1 | 1/2005 | Kohn et al. |
| 2006/0123363 | A1 | 6/2006 | Williams et al. |
| 2010/0251049 | A1 | 9/2010 | Goto et al. |
| 2011/0156008 | A1 | 6/2011 | Freedman et al. |
| 2012/0221268 | A1 | 8/2012 | Freedman et al. |
| 2014/0026107 | A1* | 1/2014 | Bocharov ......... G06F 17/5045 716/101 |
| 2014/0026108 | A1* | 1/2014 | Bocharov ......... G06N 99/002 716/102 |
| 2014/0264288 | A1* | 9/2014 | Svore ............... G06N 99/002 257/31 |
| 2014/0280404 | A1* | 9/2014 | Svore ............... G06N 99/002 708/200 |
| 2014/0280427 | A1* | 9/2014 | Bocharov ......... B82Y 10/00 708/523 |
| 2014/0297708 | A1* | 10/2014 | Svore ............... G06F 17/10 708/517 |
| 2014/0354326 | A1* | 12/2014 | Bonderson ....... G06N 99/002 326/5 |
| 2015/0006597 | A1* | 1/2015 | Troyer ............. G06N 99/002 708/201 |

OTHER PUBLICATIONS

Bocharov et al, "A Depth Optimal Canonical Form for Single Quibit Quantum Circuits", Proc of Quantum Architectures and Computation Group, Microsoft Research, Jun. 2012, 10 pgs.
Bocharov et al, "A Resource Optimal Canonical Form for Single Qubit Quantum Circuits", Journals of Physics Review Letter, col. 109, Issue 19, Nov. 2012, 2 pgs.
Bravyi et al, "Universal Quantum Computation with Ideal Clifford Gates and Noisy Ancillas", In ar Xiv: Preprint quant-ph/0403025v2, Dec. 2004, 15 pgs.
Conway et al, "On Quaternions and Octonions: Their Geometry, Arithmetic and Symmetry", In Bulletin (new Series) of the American Mathematical Society, vol. 42, Issue 2, Jan. 2005, 15 pgs.
Dawson et al, "The Solovay Kitaev Algroithm", Journal of Quantum Information and Computation, Aug. 2005, 15 pgs.
Duclos Cianci et al, "A State Distillation Protocol to Implement Arbitrary Single Quibit Rotations", Journal of Quantum Physics, Oct. 2012, 10 pgs.
Fowler, "Towards Large Scale Quantum Computation", submitted in fulfilment of requirement of degree of doctor of Philisophy, Mar. 2005, 185 pgs.
Harrow et al, "Efficient Discrete Approximations of Quantum Gates", Journal of Mathematical Physics, Jul. 2002, 7 pgs.
Jones et al, "Simulating Chemistry efficiently on Fault Tolerant Quantum Computers", Journal of Quantum Physics, Apr. 2012, 33 pgs.
Khan et al, "Synthesis of Ternary Quantum Logic Circuits by Decomposition", 7th Intl Symposium on Representations and Methodology of Future Computing Technologies RM2005, Sep. 2005, 6 pgs.
"Landau Ramanujan Constant", retrieved Nov. 18, 2013 from http://mathworld.wolfram.com/Landau-RamanujanConstant.html, 3 pgs.
Lipschitz, "Untersuchungen ueber die summen von Quadraten", In book from the collections of Harvard University, Feb. 2013, 103 pgs.
Lubotzky et al, "Hecke Operators and Distributing Points on S2. II", Communications on Pure and Applied Mathematics, vol. 40, Issue 4, Jul. 1987, 20 pgs.
Lubotzky et al, "Hecke Operators and Distributing Points on the Sphere I", Communications on Pure and Applied Mathematics, vol. 39, Issue Supplement S1, 1986, 38 pgs.
Maslov et al, "Quantum Circuit Simplification Using Templates", Proc Design, Automation and Test in Europe, Mar. 2005, 6 pgs.
Rabin et al, "Radomized Algorithms in Number Theory", Comm in Pure and Applied Mathematics, vol. 39, Issue Supplement S1, 1986, 18 pgs.
Selinger, "Efficent Clifford + T Approximation of Single Qubit Operators", in arXiv:1212.6253v1, Dec. 2012, 16 pgs.
Shende et al, "Synthesis of Quantum Logic Circuits", IEEE Transactions on Computer Aided Design Integrated Circuits and Systems, vol. 25, No. 6, Jun. 2006, 11 pgs.
Slepoy, "Quantum Gate Decomposition Algorithms", Proc of Ssandia Report, Jul. 2006, 12 pgs.
Vartiainen et al, "Efficient Decomposition of Quantum Gates", Physical Review Letters, vol. 92, No. 17, Apr. 2004, 4 pgs.
Wolfram MathWorld, Wolfram Search, retrieved Feb. 14, 2013 from http://mathworld.wolfram.com/search/?q=Landau+Ramanujan+Constant.html., 1 pg.
Yamashita et al, "Fast Equivalence Checking for Quantum Circuits", Proc IEEE and ACM Intl Symposium on Nanoscale Architectures, Jun. 2010, 6 pgs.
Zhang et al, "Generation of Quantum Logic Operations from Physical Hamiltonians", Journal of Physical Review A, Vo; I 71, Issue 5, May 2005, 17 pgs.
International Search Report and Written Opinion for International Patent Application No. PCT/US2014/026020, dated Sep. 15, 2014, 9 pages.
Singh et al., "Quantum Computing through Quaternions," International Journal of Pure and Applied Physics, 4(1): 87-96 (Oct. 2008).
Bocharov et al., "Efficient Decomposition of Single-Qubit Gates into V Basis Circuits," Physical Review A 88.1, pp. 1-13 (Mar. 6, 2013).
Matsumoto et al., Representation of Quantum Circuits with Clifford and $\pi/8$ Gates, in arXiv:0806.3834v1, 17 pages (Jun. 2008).

* cited by examiner

QUANTUM GATES
114

V BASIS SET GATES
202

$V_1 = (I + 2iX)/\sqrt{5} \quad V_1^\dagger = (I - 2iX)/\sqrt{5}$ $V_2 = (I + 2iY)/\sqrt{5} \quad V_2^\dagger = (I - 2iY)/\sqrt{5}$ $V_3 = (I + 2iZ)/\sqrt{5} \quad V_3^\dagger = (I - 2iZ)/\sqrt{5}$

R GATE
204

$R_Z(0.1) =$ $V_1^\dagger \; V_2 \; V_1 \; V_2 \; V_1^\dagger \; V_3 \; V_2 \; V_3 \; V_1 \; V_2$ $V_3 \; V_2^\dagger \; V_3^\dagger \; V_1 \; V_2^\dagger \; V_3 \; V_2 \; V_3^\dagger \; V_1 \; V_2^\dagger$ $V_1^\dagger \; V_3 \; V_1^\dagger \; V_3^\dagger \; V_2 \; V_2 \; V_2 \; V_3^\dagger \; V_1^\dagger \; V_2$ $V_1^\dagger \; V_2 \; V_1^\dagger \; V_3^\dagger \; V_1 \; V_2 \; V_2 \; V_3^\dagger \; V_2^\dagger \; V_2^\dagger$ $V_1^\dagger \; V_2 \; V_3^\dagger \; V_1^\dagger \; V_2 \; V_2 \; V_3 \; V_1 \; V_3 \; V_1^\dagger$ $V_3^\dagger \; V_1 \; V_1 \; V_3 \; V_2^\dagger \; V_2^\dagger \; V_2^\dagger \; V_2^\dagger \; V_1^\dagger \; V_1^\dagger$ $V_2 \; V_3^\dagger \; V_1 \; V_3^\dagger \; V_2^\dagger \; V_3 \; V_1^\dagger \; V_2 \; V_1 \; V_3^\dagger$ $V_2 \; V_2 \; V_1^\dagger \; V_2 \; V_2 \; V_1$

FIG. 2

METHOD AND SYSTEM FOR DECOMPOSING SINGLE-QUBIT QUANTUM CIRCUITS INTO A DISCRETE BASIS

CROSS REFERENCE TO RELATED PATENT APPLICATIONS

This patent application claims the benefit of U.S. Provisional Application No. 61/800,033, filed Mar. 15, 2013, entitled "Efficient Decomposition of Single Qubit Gates into V Basis Circuits," which provisional application is hereby incorporated in its entirety by reference.

TECHNICAL FIELD

The current application is directed to quantum computing and, in particular, to a method and system for compiling single-qubit unitary gates into circuits over a universal basis.

BACKGROUND

Enormous advances have been made in digital computing over the past 70 years. Crude, high-energy-consuming, vacuum-tube-based computer systems developed in the 1940s have evolved into today's personal computers, work stations, servers, and high-end distributed computer systems, based on multi-core single-integrated-circuit processors, that economically provide processing speeds, data-storage capacities, and data-transfer bandwidths that were unimaginable even 20 years ago. However, digital computing appears to be bounded by certain physical and problem-domain constraints.

In 1982, Richard Feynman made a suggestion for a new type of computational system based on quantum-mechanical components. He suggested that quantum computers could more efficiently address certain classes of computational problems than digital computers and, in the case of computational problems in computational chemistry and physics, provide practical approaches to computational problems that are intractable using digital computer systems. Since that time, great progress has been made in developing the theoretical foundation for quantum computing and the first quantum computers have been implemented. Various computational problems have been identified that can be addressed more efficiently by quantum computers than by classical digital computers. However, significant research and development efforts continue to be applied in order to provide practical and cost-effective general-purpose quantum-computing systems for widespread use. As one example, significant theoretical efforts are currently being applied to identify cost-effective implementations of quantum circuits.

Determining the optimal fault-tolerant compilation, or decomposition, of a quantum gate is critical for designing a quantum computer. Decomposition of single-qubit unitary gates into the {H, T} basis, where H is the Hadamard gate and T is the rotation about the z-axis by $\pi/4$, has been well studied in recent years.

However, there exists a need for alternative bases that may offer significant improvements in circuit depth or resource cost.

SUMMARY

The disclosure discusses techniques and systems which transform a given single-qubit quantum circuit expressed in a first quantum-gate basis into a quantum-circuit expressed in a second quantum-gate basis. The second quantum-gate basis comprises a universal set of quantum gates.

BRIEF DESCRIPTION OF THE DRAWINGS

FIG. 2 is a schematic diagram of example quantum gates.

DETAILED DESCRIPTION

Overview

Figure 1:
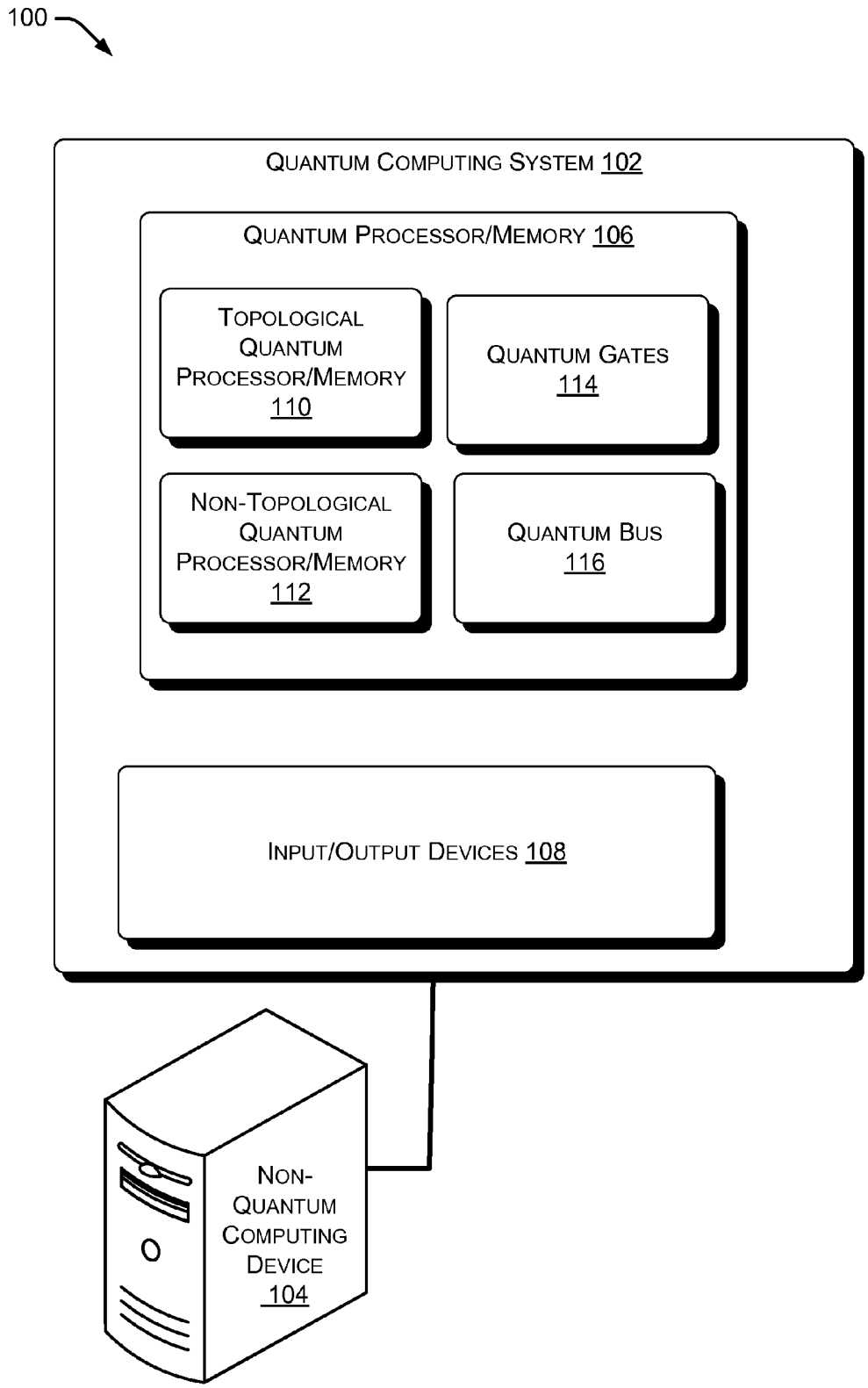
FIG. 1 is a schematic diagram of an example environment for performing quantum calculations.

This disclosure generally describes techniques for performing quantum calculations, and more particularly, describes techniques for determining a quantum circuit or a quantum gate in a particular gate basis set.

A quantum basis set is universal if any target gate can be approximated by a quantum circuit composed of the basis gates to arbitrary precision. One of the important universal quantum basis sets is V gate basis set. A unitary gate that is exactly representable in V basis is mapped to a quaternion of specific structure represented by an integer quaternion divided by an integer power of a normalization. (For example, if the V basis is normalized by $\sqrt{5}$, then the quaternion is represented by an integer quaternion divided by an half-integer power of 5.) Such a quaternion can be uniquely factorized into a sequence of small quaternion factors, which can be subsequently uniquely mapped to a sequence consisting of the V gates and at most one Pauli gate. A target quantum gate can be approximated by a unitary gate that is exactly representable in V basis and the complexity of the latter is proportional to the logarithm of the desired precision. The practical construction of an approximating unitary gate requires search in a subset of unitary gates exactly representable in V basis; such search can be either randomized (and have probabilistically polynomial complexity) or exhaustive (and have exponential complexity).

One gate basis set is the V basis. The V basis contains rotations by $\theta = \cos^{-1}(-3/5)$ around the x-, y-, and z-axis. For example, the matrix for the z-axis rotation, denoted as $V_3$, is given by $$V_3 = \frac{1}{\sqrt{5}} \begin{bmatrix} 1+2i & 0 \\ 0 & 1-2i \end{bmatrix} = \frac{1+2i}{\sqrt{5}} \begin{bmatrix} 1 & 0 \\ 0 & \frac{-(3+4i)}{5} \end{bmatrix}.$$

The x-axis rotation $V_1 = HV_3H$ and the y-axis rotation $V_2 = SV_1S^\dagger$ are both Clifford-adjoints of $V_3$, where S is rotation around the z-axis by $\pi$, and H is the Hadamard gate.

The V basis was the first basis proven to be efficiently universal, meaning that the decomposition sequence is guaranteed to be of depth $O(\log(1/\epsilon))$.

Two techniques are provided below for decomposing a single-qubit unitary into the V basis, which is an efficiently universal basis and which may have advantages over decomposing into the {H, T} basis, where H is the Hadamard gate and T is the π/8 gate. The techniques produce efficient quantum circuits that approximate a single-qubit unitary with high precision, and are computationally efficient in practice.

In addition, the techniques may be applied to Toffoli-based circuits. In some embodiments, the techniques may include first compiling into the V basis and subsequently replacing each V by a Toffoli-based circuit.

Discussed below are three possible exact constructions for implementations of a V gate on a given quantum computer architecture. Implementations of V gates could make decomposing into the V basis advantageous over decomposing into the {H,T} basis. However, it may be desired to determine an exact, fault-tolerant V gate implementation that costs less than the cost of 6 T gates (where the complete cost of a T gate could be determined, for example, based on a given state distillation protocol) so that the decomposition into the V basis is cost competitive with decomposing into the {H, T} basis.

It should be noted, at the onset, that although the current application employs mathematical notation and control-flow diagrams, the current application is directed to a method and system for producing physical, tangible, digital representations of quantum circuits that are stored in physical data-storage devices and systems, including optical disks within optical-disk drives, magnetic disks within magnetic-disk drives, electronic memories within computer systems, and other such physical, tangible data-storage devices. Furthermore, the quantum-circuit representations produced by methods and systems disclosed in the current application provide for the design of quantum circuits, the cost-effectiveness of which can be directly physically measured by the amount of data-storage-device capacity needed to store the quantum-circuit representations, by the cost in time and energy consumption in computing the representations for the quantum circuits, by the cost of implementing the quantum circuits programmatically or in hardware design, and by the time and energy consumed by the implemented quantum circuits. In other words, the current application is directed to real-world methods and systems of real-world utility that produce physical and physically measurable results.

Illustrative Environment

FIG. 1 is a schematic diagram of an example environment 100 for performing quantum calculations. The environment 100 includes a quantum computing system 102 and a non-quantum computing device 104. The non-quantum computing device 104 may be a digital computing system.

The quantum computing system 102 may include a quantum processor/memory 106 and input/output devices 108. The input/output devices 108 may include interferometers and other devices for, among other things, reading and setting states of qubits in the quantum processor/memory 106 and may include devices for interfacing with the non-quantum computing device 104.

The quantum processor/memory 106 may include topological quantum processor/memory 110, non-topological quantum processor/memory 112, quantum gates 114, and quantum bus 116. The topological quantum processor/memory 110 may include devices and components for providing topological based quantum computing, e.g., 5/2 quantum Hall systems and systems exhibiting Majorana modes such as, but not limited to, 1-dimensional or quasi 1-dimensional wires.

The non-topological quantum processor/memory 112 may include devices and components for providing non-topological based quantum computing. For example, the non-topological quantum processor/memory 112 may include devices such as, but not limited to, Josephson junctions for providing flux qubits, charge qubits, spin qubits, etc.

The quantum bus 116 may include devices and components for providing an interface between quantum processor/memory 106 and the input/output devices 108. The quantum bus 116 may include devices and components for providing an interface between qubits. For example, the quantum bus 116 may provide an interface between the topological quantum processor/memory 110 and the non-topological quantum processor/memory 112.

The quantum gates 114 may include various devices and components for performing various operations on qubit states. For example, quantum gates 114 may include devices and components for, among others, Hadamard gates, phase gates, unitary gates, controlled gates (e.g., controlled unitary gates), adder gates, and corresponding adjoint adder gates. The quantum gates 114 may be an efficiently universal set of gates in a basis set such as, but not limited to, the V basis.

The non-quantum computing device 104 may, among other things, interface with the input/output devices 108 to provide inputs (e.g., initial conditions of a problem to be solved by the quantum computing system 102) and receive outputs (e.g., measured quantum states). In some instances, the non-quantum computing device 104 may be simulate a quantum computing device and/or perform quantum calculations. In some instances, the non-quantum computing device 104 may decompose an initial quantum gate and/or initial quantum circuit and determine a sequence of quantum gates in a basis set of quantum gates that are equivalent, or equivalent to within a predetermined tolerance, of the initial quantum gate and/or initial quantum circuit. The basis set of quantum gates may be a universal set of quantum gates. As discussed herein below, the basis set of quantum gates may be, but is not limited to, a V basis set of gates.

Illustrative Quantum Gates

FIG. 2 shows a non-limiting embodiment of example quantum gates 114. The quantum gates 114 may include a basis set of gates 202. The basis set of gates 202 may be a universal set of gates—i.e., a set of gates with which any computation may be performed. As a non-limiting example, the basis set of gates 202 may be a V(5) basis set of gates denoted by:

$$V_1(5)=(I+2iX)/\sqrt{5}, V_1^\dagger(5)=(I-2iX)/\sqrt{5},$$

$$V_2(5)=(I+2iY)/\sqrt{5}, V_2^\dagger(5)=(I-2iY)/\sqrt{5},$$

$$V_3(5)=(I+2iZ)/\sqrt{5}, V_3^\dagger(5)=(I-2iZ)/\sqrt{5},$$

where I, X, Y, and Z denote the Pauli matrices:

$$I = \begin{pmatrix} 1 & 0 \\ 0 & 1 \end{pmatrix},$$

$$X = \begin{pmatrix} 0 & 1 \\ 1 & 0 \end{pmatrix},$$

$$Y = \begin{pmatrix} 0 & -i \\ i & 0 \end{pmatrix},$$

-continued and $$Z = \begin{pmatrix} 1 & 0 \\ 0 & -1 \end{pmatrix}.$$

The above six unitaries $\{V_i(5), V_i^\dagger(5)\ i=1;\ 2;\ 3\}$ provide a definition of the V(5) basis set. The subgroup $(V) \subset SU(2)$ generated by the V(5) basis is everywhere dense in SU(2) and thus $\{$Clifford gates, $V_i(5)$, $V_i^\dagger(5)\ i=1;\ 2;\ 3\}$ is a universal basis.

However, it should be noted that there are other definitions of a V basis set. Other V basis sets such as, but not limited to, V(13) basis set, V(17) basis set, V(29) basis set, V(101) basis set, V(257) basis set and V(4097) basis set, while not discussed in detail, are included within the scope of this disclosure.

A unitary gate such as, but not limited to, a rotation gate may be decomposed and represented as a sequence of V gates. For example, the quantum gates 114 includes an exemplary rotation gate (R gate) 204, which provides a rotation about the z-axis by 0.1 radians. Expanded in the V(5) basis set of gates to a precision of $4.3 \times 10^{-15}$, the 0.1 radian rotation about the z-axis is implemented by a sequence of 76 V(5) gates.

It should be remembered that the rotation gate 204 is an example of a gate implemented as a sequence of a basis set of gates and that in the quantum gates 114 may include other gates that are implemented sequences of the basis set of gates.

Example Quantum Circuits

Figure 3:
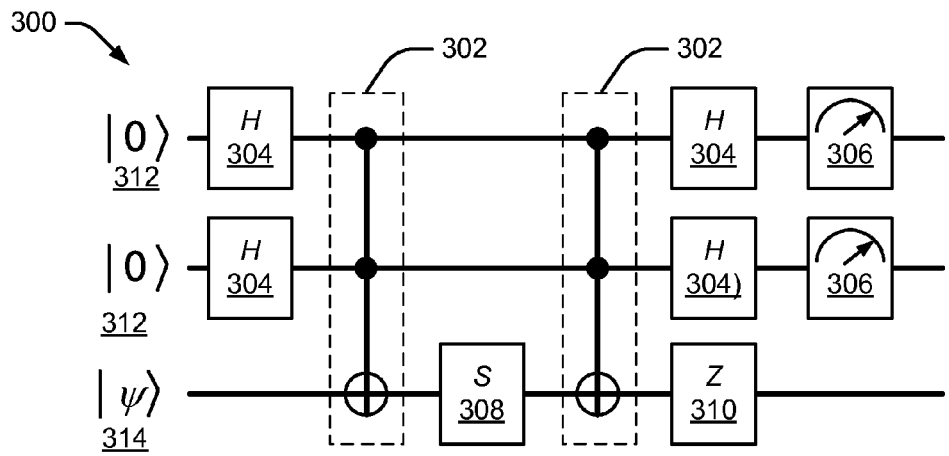
FIGS. 3-6 are schematic diagrams of example quantum circuits.

FIG. 3 illustrates an example quantum circuit 300 for implementing a $V_3(5)$ gate. The quantum circuit 300 includes two Toffoli gates 302, four Hadamard gates (H) 304, two measurement devices 306, an S gate 308, and a Pauli Z gate 310 and utilizes two ancillae qubits 312. The quantum circuit 300 is a $V_3(5)$ gate to perform $V_3(5)|\psi\rangle$ when both measurement outcomes are zero (0), or $|\psi\rangle$ otherwise.

As shown in FIG. 3, the quantum circuit 300 (the $V_3(5)$ gate) is made from "elemental gates," which in this particular embodiment includes the Toffoli gates 302, the Hadamard gates (H) 304, the S gate 308, and the Pauli Z gate 310. In other embodiments, the $V_3(5)$ gate may be made from elemental gates that are arranged differently than that shown in FIG. 3 and/or include different elemental gates and/or more or less elemental gates.

Although not shown, other gates of the V basis set are also made up of elemental gates.

In some instances, the quantum circuit 300 may be used in conjunction with protocols for distilling Toffoli states. For example, a given V gate can be approximated using a $\{H, T\}$ decomposition, which may result in a circuit of length 70 or more, depending on the desired precision. However, two embodiments of exact implementations of the $V_3(5)$ gate, which achieve perfect precision, are provided below.

In matrix form, a $V_3(5)$ gate ($V_3(5)=(I+2iZ)/\sqrt{5}$.) can be represented as:

$$V_3(5) = \frac{1}{\sqrt{5}}\begin{bmatrix} 1+2i & 0 \\ 0 & 1-2i \end{bmatrix} = \frac{1+2i}{\sqrt{5}}\begin{bmatrix} 1 & 0 \\ 0 & \frac{-(3+4i)}{5} \end{bmatrix}$$

The other $V_i(5)$ gates $\{V_i(5), V_k^\dagger(5)\ i=1, 2,$ and $k=1;\ 2;\ 3\}$ can then be implemented using $V_3(5)$ and Clifford gates.

Implementing $V_3$ with Toffoli Gates

With probability 5/8, $V_3(5)$ is applied to the target qubit $|\psi\rangle$ 314, otherwise the identity is applied. The expected number of times this quantum circuit 300 must be repeated in order to result in the application of $V_3(5)$ is 8/5, with an expected cost of 3.2 Toffolis.

In addition, a generalization to $V_3(p_i)$ gates, where $p_0=5$, $p_1=17$, $p_2=101$, $p_3=257$, $p_4=4097$, ..., can be implemented using a nested circuit based on FIG. 3, where the S gate 308 is replaced with $V(p_{i-1})$ for $i>0$. When $i=0$, the circuit is the same as in FIG. 3. The expected number of applications of the outermost circuit rapidly approaches 1 as $p_i$ grows. For example, for $V_3$ $(p_i)$ gates, where $p_0=5$, $p_1=17$, $p_2=101$, $p_3=257$, $p_4=4097$, the expectation is 8/5, 20/17, 104/101, 260/257, 4100/4097, respectively.

Implementing $V_3$ with State Distillation

Ignoring global phase, the angle of rotation θ about the z-axis invoked by $V_3$ is solved for using the following identity:

$$e^{i\theta} = \cos\theta + i\sin\theta = \frac{-(3+4i)}{5} \Rightarrow \theta = \cos^{-1}\left(-\frac{3}{5}\right) \approx 4.06889.$$

Consider the angle $$\theta' = \cos^{-1}\left(\frac{3}{5}\right) \approx 0.927295.$$

This angle is π away from θ:θ=θ'+π. Thus, to implement rotation $R_Z(\theta)$, one can implement the gate sequence $R_Z(\theta) = R_Z(\theta')R_Z(\pi)$, where $R_Z(\pi)$ is the Pauli Z gate and $$\theta' = 2\theta_2 + \frac{\pi}{4},$$

where $2\theta_2$ is the angle resulting from using the resource state $e^{-i\pi/8}HS^\dagger|H_2\rangle$. The $$\frac{\pi}{4}$$

part of the angle is a $T=R_Z(\pi/4)$ gate, thus $R_Z(\theta')=R_Z(2\theta_2)T$, and $R_Z(\theta)=R_Z(2\theta_2)TZ$.

Figure 4:
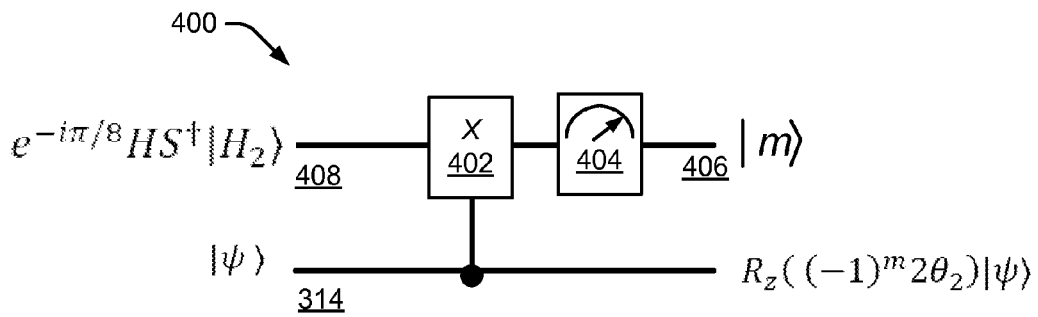

FIG. 4 illustrates an example quantum circuit 400 that obtains a rotation of $Z(2\theta_2)$. The quantum circuit 400 results in the application of $\pm 2\theta_2$ to $|\psi\rangle$, each with equal probability. If m=0, then $R_Z(2\theta_2)$ has been applied. If m=1, $R_Z(4\theta_2)$ is applied.

The quantum circuit 400 includes a controlled Pauli X gate 402 and a measuring device 404, which measures a state $|m\rangle$ 406 of the controlled Pauli X gate 402. The controlled Pauli X gate 402 is applied to an ancillary state 408 and the target qubit 314 is the control. In this illustrated example, the ancillary state 408 is given by $e^{i\pi/8}HS^\dagger|H_2\rangle$, where $|H_2\rangle$ is a non-stabilizer ladder state.

Figure 5:
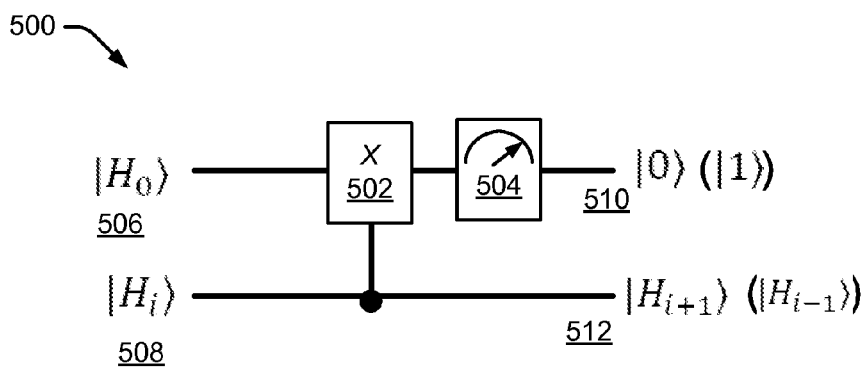

FIG. 5 illustrates an example quantum circuit 500 that obtains ladder $|H_i\rangle$ states from initial resource states $|H_0\rangle$. The quantum circuit 500 includes a controlled-NOT Pauli gate 502 and a measuring device 504. The quantum circuit 500 measures the parity of two input qubits, first qubit 506 and second qubit 508, and decodes the resulting state into the second qubit 508.

Let the first qubit 506 and second qubit 508 be magic states |H⟩ and define $$\theta_0 = \frac{\pi}{8}:$$

$$|H\rangle = |H_0\rangle = \cos\theta_0|0\rangle + \sin\theta_0|1\rangle.$$

Upon application of the controlled-NOT gate $\Lambda(X)$, $$|H_0\rangle|H_0\rangle \xrightarrow{\Lambda(X)} \cos^2\theta_0|00\rangle + \sin^2\theta_0|01\rangle + \cos\theta_0\sin\theta_0(|11\rangle + |10\rangle).$$

Upon measurement m 510 of the first qubit 506 by measurement device 504, the state 512 of the second qubit 508 is given by:

$$\xrightarrow{m=0} \frac{\cos^2\theta_0|00\rangle + \sin^2\theta_0|01\rangle}{\cos^4\theta_0 + \sin^4\theta_0}, \text{ or } \xrightarrow{m=1} \frac{1}{\sqrt{2}}(|0\rangle + |1\rangle).$$

Let $\theta_1$ be defined such that $$\cos\theta_1|0\rangle + \sin\theta_1|1\rangle = \frac{\cos\theta_0|0\rangle + \sin\theta_0|1\rangle}{\cos^4\theta_0 + \sin^4\theta_0},$$

it can be deduced that $\cot\theta_1 = \cot^2\theta_0$.

Thus, $|H_1\rangle = \cos\theta_1|0\rangle + \sin\theta_1|1\rangle$, which is a non-stabilizer state obtained from |H⟩ states, Clifford operations, and measurements.

If the measurement outcome 510 is 1, then a stabilizer state is obtained and the output is discarded. The measurement outcomes occur with respective probabilities $$p_{m=0,0} = \cos^4\theta_0 + \sin^4\theta_0 = \frac{3}{4}$$

and $$p_{m=1,0} = 1 - p_0 = \frac{1}{4}.$$

Now consider the next step of the ladder. This protocol is recursive, using the non-stabilizer states produced by the previous round of the protocol as input to the quantum circuit 500. In this case, the recursion need only go to state $|H_2\rangle$, which is defined as $|H_2\rangle = \cos\theta_2|0\rangle + \sin\theta_2|1\rangle$, where $\cot\theta_2 = \cot^3\theta_0$.

To obtain this state, the quantum circuit 500 receives as inputs, the previously produced $|H_1\rangle$ state and a new $|H_0\rangle$ state:

$$|H_0\rangle|H_1\rangle \xrightarrow{\Lambda(X)} \cos\theta_0\cos\theta_1|00\rangle + \sin\theta_0\sin\theta_1|01\rangle + \sin\theta_0\cos\theta_1|10\rangle + \cos\theta_0\sin\theta_1|11\rangle.$$

Upon measurement of the first qubit 506, the state 512 is given by:

$$\xrightarrow{m=0} (\cos\theta'|0\rangle + \sin\theta'|1\rangle),$$
$$\xrightarrow{m=1} (\cos\theta''|0\rangle + \sin\theta''|1\rangle),$$

where $$\cot\theta' = \cot\theta_1 \cot\theta_0 = \cot^3\theta_0 = \cot\theta_2, \text{ and where}$$

$$\cot\theta'' = \cot\theta_1 \tan\theta_0 = \cot^1\theta_0 = \cot\theta_0.$$

Thus, the state $|H_2\rangle$ is obtained by measuring m=0, and the state $|H_0\rangle$ is obtained by measuring m=1. The probability of measuring 0 is given by $$p_{m=0,1} = \cos^2\theta_1 \cos^2\theta_0 + \sin^2\theta_1 \sin^2\theta_0.$$

It should be noted that $$\frac{3}{4} \leq p_{m=0,i} < \cos^2\frac{\pi}{8} = 0.853\ldots,$$

so the probability of obtaining $|H_2\rangle$ is far higher than the probability of obtaining $|H_0\rangle$.

Other Example $V_3$ Gates

Figure 6:
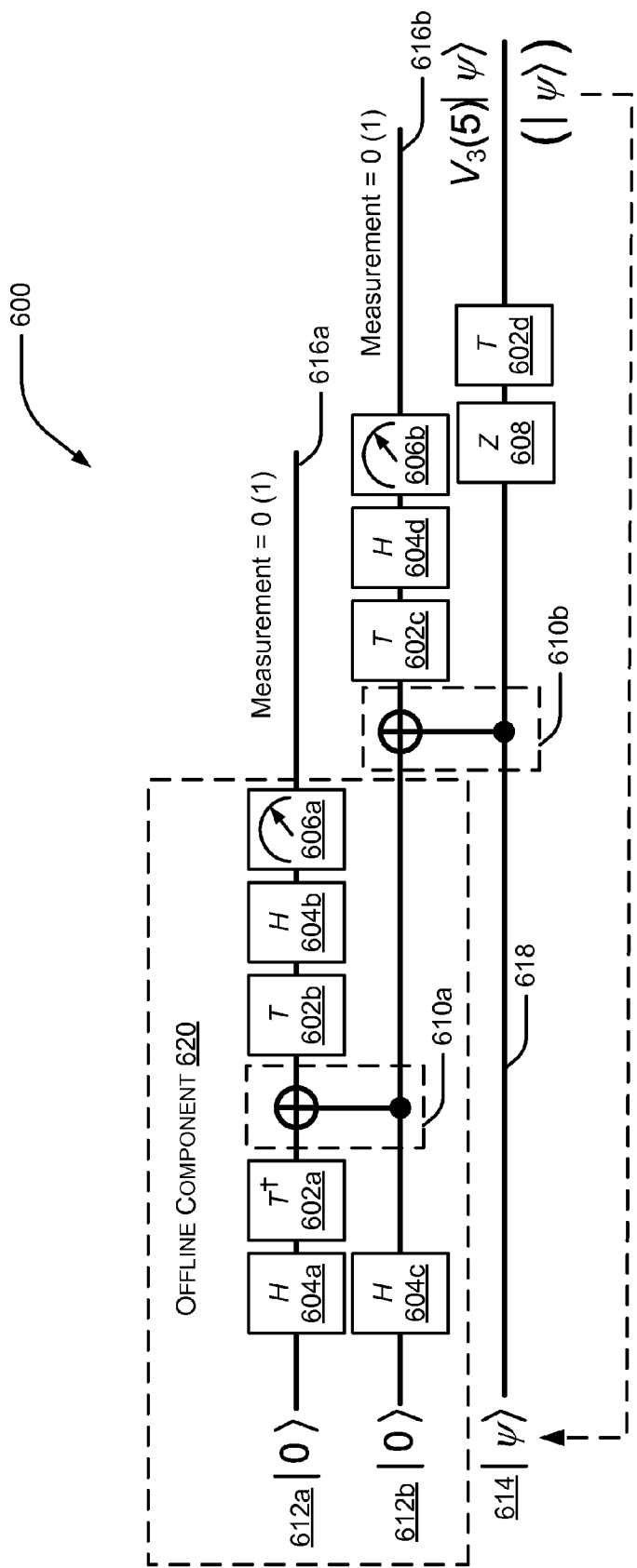

FIG. 6 illustrates an example quantum circuit 600 for implementing a $V_3(5)$ gate and may be a fault tolerant gate. The quantum circuit 600 includes four T ($\pi/8$) gates, individually referenced as 602a-602d and collectively referenced as 602, four Hadamard gates (H), individually referenced as 604a-604d and collectively referenced as 604, two measurement devices, individually referenced as 606a-606b and collectively referenced as 606, a Pauli Z gate 608, and two CNOT gates, individually referenced as 610a-610b and collectively referenced as 610. It should be noted that one of the T ($\pi/8$) gates 602a is an adjoint denoted by $T^\dagger$. The quantum circuit 600 utilizes two ancillae qubits, individually referenced as 614a-616b and collectively referenced as 614, and is applied to a quantum state |ψ⟩ 614. The quantum circuit 600 is a $V_3(5)$ gate to perform $V_3(5)|\psi\rangle$ when both measurement outcomes are zero (0), or |ψ⟩ otherwise.

As shown in FIG. 6, the quantum circuit 600 (the $V_3(5)$ gate) is made from "elemental gates," which in this particular embodiment includes the T ($\pi/8$) gates 602, the Hadamard gates (H) 604, the Pauli Z gate 608, and the CNOT gates 610. In other embodiments, the $V_3(5)$ gate may be made from elemental gates that are arranged differently than that shown in FIG. 6 and/or include different elemental gates and/or more or less elemental gates.

In the illustrated embodiment, the CNOT gate 610a bridges ancillary qubit wires 616a and 616b, and the CNOT gate 610b bridges ancillary qubit wire 616b and computational qubit wire 618, where the ancillary wire 616b is the control to the CNOT gate 610a and the computational qubit wire 618 is the control to the CNOT gate 610b.

On the ancillary qubit wire 616a, operations are performed in the following order: Hadamard gate 604a, T adjoint gate 602a, CNOT gate 610a, T gate 602b, Hadamard gate 604b, and measurement device 606a.

On the ancillary qubit wire 616b, operations are performed in the following order: Hadamard gate 604c, CNOT gate 610a, CNOT gate 610b, T gate 602c, Hadamard gate 604d, and measurement device 606b.

On the computational qubit wire 618, operations are performed in the following order: CNOT gate 610b, Z gate 608, and T gate 602d.

However, it should be noted that some of the gates in the quantum circuit 600 may commute. For example, T gates and Z gates commute, T gates and CNOT gates commute when the T is on the control qubit, and Z gates and CNOT gates commute when the Z is on the control qubit. Consequently, in some embodiments, the gates of the quantum circuit 600 may be arranged in a different sequence than that shown in FIG. 6, and the order of operations will be correspondingly altered, but such embodiments will provide quantum circuits that are equivalent to the quantum circuit 600.

Further, in some instances, gates of the quantum circuit 600 may be reordered, or commuted with each other, in different runs. For example, on odd number runs (e.g., first, third, etc.) the CNOT gate 610b, Z gate 608, and T gate 602d may be arranged in the sequence shown in FIG. 6, and on even number runs (e.g., second, fourth, etc.), the CNOT gate 610b, T gate 602d and Z gate 608 may be arranged (from left to right) T gate 602d, Z gate 608, and then CNOT gate 610b.

The Hadamard gates 604a-604c, the T gates 602a, 602b, the measurement device 606a, and the CNOT gate 610a comprise an ancillary state generator 620. In some instances, the ancillary state generator 620 may be implemented or prepared independent of the quantum state $|\psi\rangle$ 614. For example, the ancillary state generator 620 may be prepared to be in a certain state (e.g., measurement device 606a measures zero (0)) independent of the quantum state $|\psi\rangle$ 614. For example, the ancillary state generator 620 can be run in an offline mode (e.g., before the quantum state $|\psi\rangle$ 614 exists or before the quantum state $|\psi\rangle$ 614 is received at the computational qubit wire 618). It should be noted that the quantum state $|\psi\rangle$ 614 may decohere over time. Consequently, in some instances, it may be preferable to run the ancillary state generator 620 in offline mode so as to prepare a desired state (e.g., the measurement device 606a measures zero (0)) before the quantum state $|\psi\rangle$ 614 is received at the computational qubit wire 618 so as to prevent, or reduce, decoherence of the quantum state $|\psi\rangle$ 614.

However, in some instances, the ancillary state generator 620 may be implemented or prepared in conjunction with the quantum state $|\psi\rangle$ 614. The ancillary state generator 620 may be run in an online mode in conjunction with the quantum state $|\psi\rangle$ 614.

In offline mode, the ancillary state generator 620 can be implemented as many times as is required to put the ancillary state generator 620 in the desired state without affecting the quantum state $|\psi\rangle$ 614. For example, at the start of each run, the ancillary state generator 620 is provided with two ancillary qubits 614 in state $|0\rangle$, and if the measurement device 616a does not measure zero (0), the run is tossed out, and a new run (with fresh ancillary qubits 614 in state $|0\rangle$) is commenced until the measurement device 616a does measure zero (0). There is a 3/4 probability that the measurement device 606a measures zero (0) and yields the desired state.

When the ancillary state generator 602 is run offline to ensure that the measurement device 606a measures zero (0), there is a 5/6 probability that the measurement device 606b will also measure zero (0). When the ancillary state generator 602 is run online and repeated to ensure that the measurement device 606b will also measure (0), there is also a 5/6 probability that the measurement device 606b will also measure (0). When both the measurement 616a and measurement 616b are performed irrespective of the measurement result 616a, then there is an overall probability of 5/8 that both of the measurement devices 606 will measure zero (0). When the probability of success of measurement of 616b is 5/6 given that measurement of 616a is 0, the expected T count is approximately 5.26. Measure 616b prior to applying 608 and 602d on qubit 614. Given that measurement of 616a has resulted in 0, then if a first attempt at measuring 616b fails and results in measurement result 1 (with probability of 1/6), then wait to apply gate 608 and 602d until the measurement result of the next attempt is known. In the next attempt, T gate 602d and Z gate 608 are commuted through the CNOT 610b (i.e., from left to right the sequence of the gates is T gate 602d, Z gate 608, and CNOT gate 610b). If a second attempt by the measurement device 616b succeeds and results in measurement result 0, then the two T gates 602d combine and result in an S gate. Similarly, the two Z gates 608 can be commuted with the S gate and combine to an I gate. Thus, if the total number of attempts is k, then the expected T gate cost is given by $$\left(\left(\frac{4}{3} \times 2\right) + 1\right)k + (k \bmod 2).$$

The probability that exactly k attempts are required is given by $$\left(\frac{5}{6}\right)\left(\frac{1}{6}\right)^{k-1}.$$

Summing over k gives an expected T count of 5.26. It can be shown the T gate count is approximately 6.4 when the overall probability of success is 5/8 and the measurement of 616a and 616b are performed irrespective of the measurement result of 616a.

When the measurement devices 606 measure zero (0), the desired unitary $V_3(5)$ has been applied to the quantum state $|\psi\rangle$ 614. However, when one or both of the measurement devices 606 measure one (1), the identity (I) gate is the result, up to a known Clifford gate conjugation. Since measurements of one (1) result in $I|\psi\rangle$ or $|\psi\rangle$, up to a known Clifford gate conjugation, this result ($|\psi\rangle$) can be looped back to the quantum circuit 600, repeatedly, until the measurements by the measurement devices 606 are zero (0). At which point, the desired unitary $V_3(5)$ has been applied to the quantum state $|\psi\rangle$ 614.

Illustrative Non-Quantum Computing Device

Figure 7:
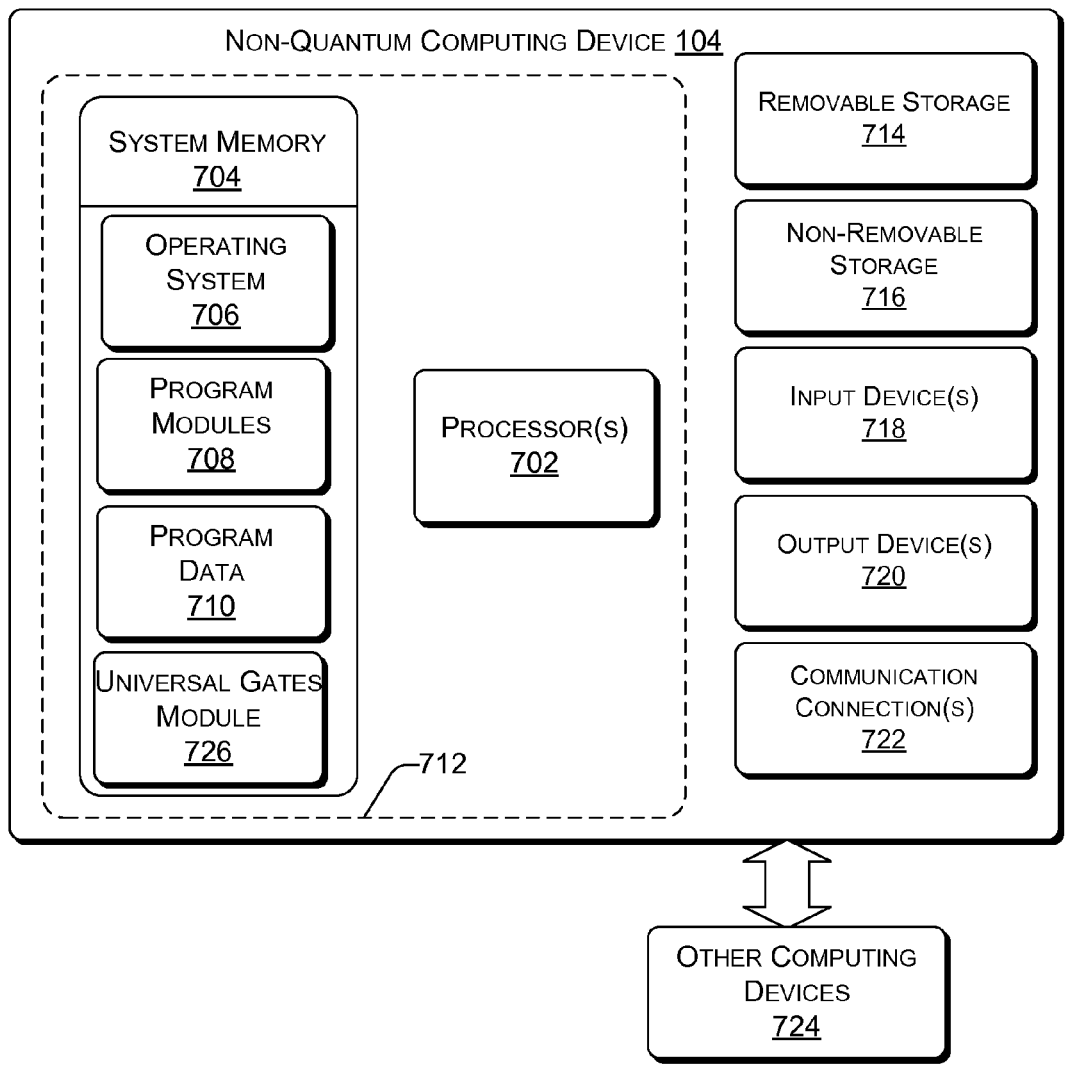
FIG. 7 is a schematic diagram of an example non-quantum computing device for use in the environment for performing quantum calculations.

FIG. 7 shows an illustrative non-quantum computing device 104 that may be used in environment 100. It will readily be appreciated that the various embodiments described above may be implemented in other computing devices, systems, and environments. The non-quantum computing device 104 shown in FIG. 7 is only one example of a computing device and is not intended to suggest any limitation as to the scope of use or functionality of the computer and network architectures. The non-quantum computing device 104 is not intended to be interpreted as having any dependency or requirement relating to any one or combination of components illustrated in the example computing device.

In a very basic configuration, the non-quantum computing device 104 typically includes at least one processor 702 and system memory 704. The processor 702 is a non-quantum processing unit such as, for example, a conventional computer processor such as a digital processor. Depending on the exact configuration and type of computing device, the system memory 704 may be volatile (such as RAM), non-volatile (such as ROM, flash memory, etc.) or some combination of the two. The system memory 704 typically includes an operating system 706, one or more program modules 708, and may include program data 710. The computing device 104 is of a very basic configuration demarcated by a dashed line 712.

The program modules 708 may include instructions for, among other things, implementing simulations of quantum systems on the non-quantum computing device 104, providing control signals to the quantum computing system 102, and receiving data from the quantum computing system 102. In addition, the program modules 708 may include instructions for, implementing simulations of quantum calculations and/or simulating quantum computers.

The non-quantum computing device 104 may have additional features or functionality. For example, the computing device 104 may also include additional data storage devices (removable and/or non-removable) such as, for example, magnetic disks, optical disks, or tape. Such additional storage is illustrated in FIG. 7 by removable storage 714 and non-removable storage 716. Computer-readable media may include, at least, two types of computer-readable media, namely computer storage media and communication media. Computer storage media may include volatile and non-volatile, removable, and non-removable media implemented in any method or technology for storage of information, such as computer readable instructions, data structures, program modules, or other data. The system memory 704, the removable storage 714 and the non-removable storage 716 are all examples of computer storage media. Computer storage media includes, but is not limited to, random-access-memory (RAM), read-only-memory (ROM), electrically erasable programmable ROM (EEPROM), flash memory or other memory technology, compact disk (CD), CD-ROM, digital versatile disks (DVD), or other optical storage, magnetic cassettes, magnetic tape, magnetic disk storage or other magnetic storage devices, or any other non-transmission medium that can be used to store the desired information and which can be accessed by the non-quantum computing device 104. Any such computer storage media may be part of the non-quantum computing device 104. Moreover, the computer-readable media may include computer-executable instructions that, when executed by the processor(s) 702, perform various functions and/or operations described herein.

In contrast, communication media embodies computer-readable instructions, data structures, program modules, or other data in a modulated data signal, such as a carrier wave, or other transmission mechanism. As defined herein, computer storage media does not include communication media.

The non-quantum computing device 104 may also have input device(s) 718 such as keyboard, mouse, pen, voice input device, touch input device, etc. Output device(s) 720 such as a display, speakers, printer, etc. may also be included. These devices are well known in the art and are not discussed at length here.

The non-quantum computing device 104 may also contain communication connections 722 that allow the device to communicate, such as over a network, with other computing devices 724 including the quantum computing system 102. These networks may include wired networks as well as wireless networks. The communication connections 722 are one example of communication media.

The illustrated non-quantum computing device 104 is only one example of a suitable device and is not intended to suggest any limitation as to the scope of use or functionality of the various embodiments described. Other well-known computing devices, systems, environments and/or configurations that may be suitable for use with the embodiments include, but are not limited to personal computers, server computers, hand-held or laptop devices, multiprocessor systems, microprocessor-base systems, set top boxes, game consoles, programmable consumer electronics, network PCs, minicomputers, mainframe computers, distributed computing environments that include any of the above systems or devices, and/or the like.

The system memory 704 may also include Universal Gates module 726. The Universal Gates module 726 may include instructions for determining a replacement sequence of quantum gates. For example, the Universal Gates module 726 may receive a mathematical expression of an input/target quantum gate, decompose the input/target quantum gate, and determine the replacement sequence of quantum gates, where the replacement sequence of quantum gates is approximately equivalent to, or within a predetermined precision level of, the input/target gate, and where the replacement sequence of quantum gates is a sequence of universal gates such as V gates. The replacement gates may be stored in Universal Gates module 726 and/or in program data 710 or in other memory, e.g., removable storage 714 and/or non-removable storage 716.

It should be noted that the non-quantum computing device 104 stores and manipulates information represented as binary numbers, or digits, of various lengths.

Quantum Computing and Qubits

FIGS. 8A-D illustrate a quantum bit, referred to as a "qubit," which is a fundamental data-storage unit of many quantum-computing systems. The qubit is a quantum-computing analog of a classical digital-computer-system bit. A classical bit is considered to occupy, at any given point in time, one of two possible states corresponding to the binary digits "0" and "1." Of course, the classical bit is a high-level abstraction of a hardware implementation of the classical bit and, at the molecular level, the transistors and other circuit components and wiring that together compose a classical bit have an infinite number of quantum-mechanical states. Nonetheless, the complex quantum-mechanical states of a hardware implementation of a classical bit fall into two discrete and measureable subspaces that, in the aggregate, correspond to discrete and differentiable macroscopic states corresponding to binary digits "0" and "1."

By contrast, a qubit is implemented in hardware by tiny, physical components with quantum-mechanical characteristics that are generally contained within macroscopic subsystems. These tiny physical components can have an infinite number of different quantum-mechanical states. When the state of a qubit is physically measured, the measurement produces one of two different basis states $|0\rangle$ and $|1\rangle$. The quantum-mechanical state of a qubit is represented as a state vector representing a superposition of the two states $|0\rangle$ and $|1\rangle$:

$$|\psi\rangle = \alpha|0\rangle + \beta|1\rangle$$

where $\alpha$ and $\beta$ are complex numbers and $|\alpha|^2 + |\beta|^2 = 1$. The qubit state vector can be represented in vector notation as:

$$|\psi\rangle = \begin{bmatrix} \alpha \\ \beta \end{bmatrix}.$$

The choice of vector representations of the states $|0\rangle$ and $|1\rangle$ is somewhat arbitrary, but to facilitate mathematical operations, these two vectors are generally chosen to be orthonormal and are often assigned the vector representations:

$$|0\rangle = \begin{bmatrix} 1 \\ 0 \end{bmatrix}$$

$$|1\rangle = \begin{bmatrix} 0 \\ 1 \end{bmatrix}.$$

The notation $|\rangle$ is, in the Dirac notation, referred to as the "ket" notation for vectors of an inner-product vector space. This inner-product vector space has a dual inner-product vector space, the vectors of which are represented by the Dirac bra notation $\langle|$. The corresponding dual-inner-product vector space vectors for the above-discussed qubit state vectors are:

$$\langle\psi| = [\alpha^*, \beta^*]$$

$$\langle 0| = [1, 0]$$

$$\langle 1| = [0, 1]$$

where $\alpha^*$ is the complex conjugate of $\alpha$. The magnitude of a qubit state vector is computed as the square root of the inner product of the state vector and its corresponding dual state vector:

$$|\langle\psi\| = \sqrt{\langle\psi|\psi\rangle}$$
$$= \sqrt{\alpha\alpha^* + \beta\beta^*}$$
$$= 1.$$

Thus, state vectors used to describe qubit states are normalized to have a magnitude of 1, which is indicated by the "normal" syllable of the term "orthonormal." The "ortho" syllable refers to the fact that the state vectors $|0\rangle$ and $|1\rangle$ are chosen to be orthogonal, to simplify various operations, including taking inner products. Note that, by one convention, kets are represented by columns vectors and bras by row vectors. A complex row vector multiplied by a complex column vector, as in the above expression for the square root of the inner product of the state vector $|\psi\rangle$, produces a real number, while a column vector multiplied by a row vector produces a generally complex-valued matrix.

The quantum-mechanical state $|\psi\rangle$ of a qubit is not directly observable by measurement. Instead, physical measurement operations are performed on a qubit to produce a measured state in a computational basis such as the basis $|0\rangle$ or $|1\rangle$. The measurement operations can be represented as 2×2 matrices $M_0$ and $M_1$:

$$M_0 = |0\rangle\langle 0| = \begin{bmatrix} 1 & 0 \\ 0 & 0 \end{bmatrix}$$

$$M_1 = |1\rangle\langle 1| = \begin{bmatrix} 0 & 0 \\ 0 & 1 \end{bmatrix}.$$

The probability that a measurement of a qubit in state $|\psi\rangle$ will return a state $|0\rangle$ or $|1\rangle$ is obtained by the inner product:

$$p_m = \langle\psi|M_m^\dagger M_m|\psi\rangle$$

where m is 0 or 1, corresponding to a measurement that produces $|0\rangle$ or $|1\rangle$, respectively. For example, the probability $p_0$ that a measurement of the state of a qubit in state $|\psi\rangle$ produces $|0\rangle$ is obtained as:

$$p_0 = \langle\psi|M_0^\dagger M_0|\psi\rangle$$
$$= [\alpha^*, \beta^*]\begin{bmatrix} 1 & 0 \\ 0 & 0 \end{bmatrix}\begin{bmatrix} \alpha \\ \beta \end{bmatrix}$$
$$= \alpha\alpha^*$$
$$= |\alpha|^2.$$

By a similar computation:

$$p_1 = |\beta|^2.$$

Thus, the squares of the magnitudes of the coefficients $\alpha$ and $\beta$ in the expression $|\psi\rangle = \alpha|0\rangle + \beta|1\rangle$ correspond to the probabilities that a measurement of a qubit in state $|\psi\rangle$ will produce states $|0\rangle$ and $|1\rangle$, respectively.

Figure 8A:
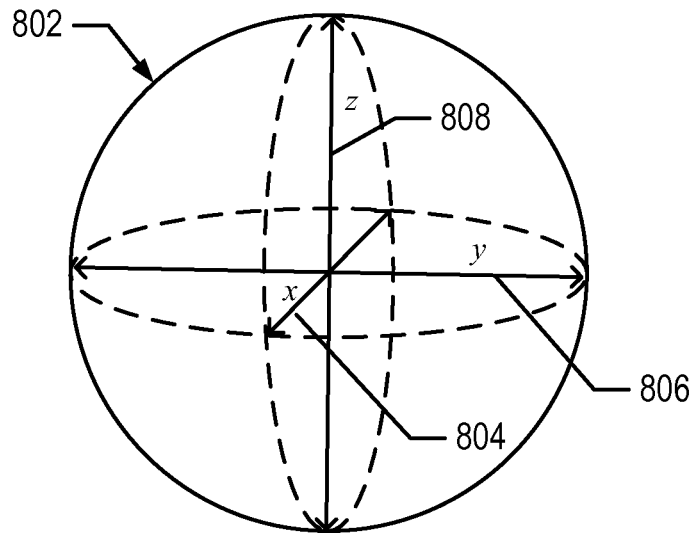
FIGS. 8A-D illustrate an example quantum bit, referred to as a "qubit," which is a fundamental data-storage unit of many quantum-computing systems.

FIG. 8A shows a unit sphere 802 centered within a Cartesian coordinate system with orthonormal axes x 804, y 806, and z 808.

Figure 8B:
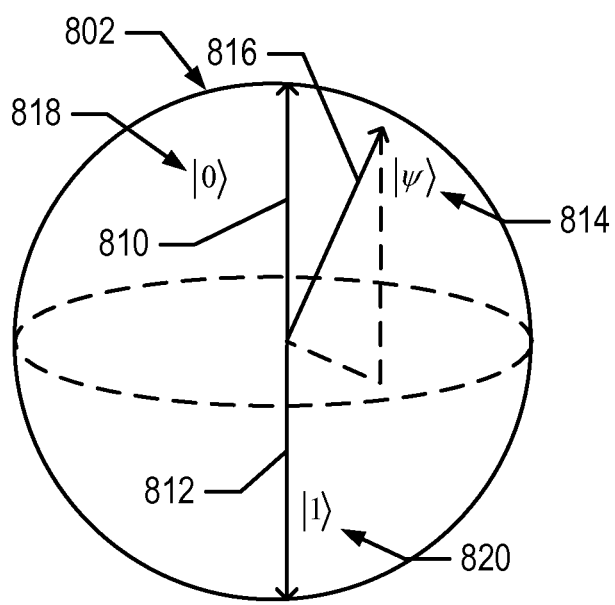

Referring to FIG. 8B, the z axis 808 is comprised of positive z axis 810 and negative z axis 812, and the surface of this unit sphere represents all of the possible qubit state vectors $|\psi\rangle$ 814 with unit modulus, analogous to the circle of an Argand diagram, discussed below, that represents all possible complex numbers of unit modulus.

FIG. 8B shows an arbitrary unit vector 816 representing the qubit state vector $|\psi\rangle$ 814 within the unit sphere 802. A vector of unit magnitude collinear with the positive z axis 410 is arbitrarily chosen to represent state vector $|0\rangle$ 818 and the vector of unit magnitude collinear with the negative z axis 812 is chosen to represent state vector $|1\rangle$ 820. Pairs of points at which a line passing through the origin intersects the unit sphere correspond to orthogonal state vectors. The arbitrary single-qubit state vector $|\psi\rangle$ 814 is a linear combination of the two computational-basis state vectors $|0\rangle$ and $|1\rangle$, as expressed by $|\psi\rangle = \alpha|0\rangle + \beta|1\rangle$, and can thus be any vector that can be inscribed within the unit sphere, with the particular vector corresponding to $|\psi\rangle$ 814 depending on the values of $\alpha$ and $\beta$. The representation of the state of a qubit shown in FIG. 8B is referred to as a Bloch sphere.

Figure 8C:
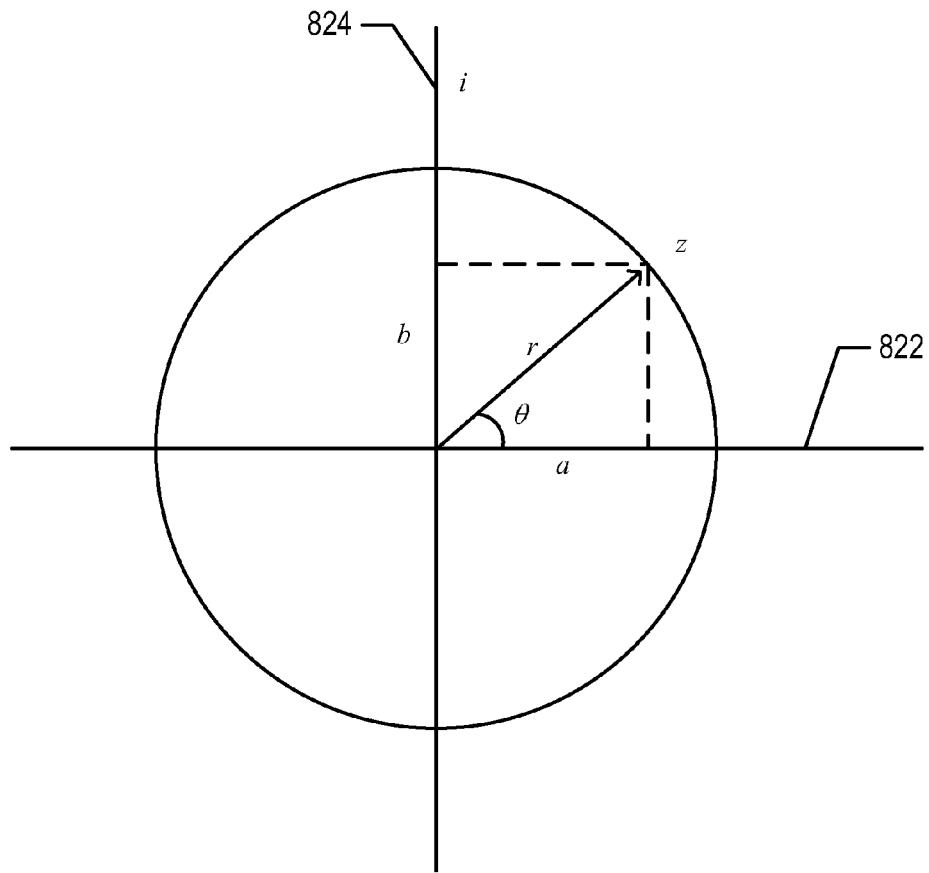

FIG. 8C shows the Argand diagram frequently used to illustrate various ways to represent a complex number. The horizontal axis 822 represents the real numbers and the vertical axis 824 represents the imaginary numbers. The general expression for a complex number z is:

$$z = a + ib$$

where a and b are real numbers and $i = \sqrt{-1}$. Because $$a = r\cos\theta$$

$$b = r\sin\theta,$$

as shown in FIG. 8C, the complex number z can be alternatively expressed in polar form as:

$$z = r(\cos\theta + i\sin\theta)$$
$$= re^{i\theta}$$
$$= e^{i\theta} \text{ for } |r|$$
$$= 1..$$

Figure 8D:
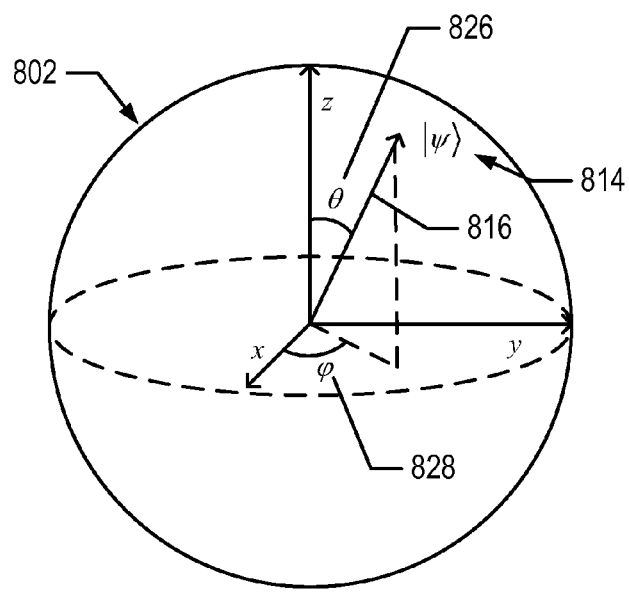

FIG. 8D shows a complete representation of the Bloch sphere for the arbitrary state vector $|\psi\rangle$ 814. The unit vector 816 representing the qubit state vector $|\psi\rangle$ 814 can be specified with two angles θ 826 and φ 828. Using the polar form for the complex coefficients α and β, state vector $|\psi\rangle$ can be expressed as:

$$|\psi\rangle = r_\alpha e^{i\phi_\alpha}|0\rangle + r_\beta e^{i\phi_\beta}|1\rangle$$

As previously discussed the squares of the magnitudes of the coefficients α and β correspond to the probabilities that a measurement of a qubit in state $|\psi\rangle$ 814 will return state vectors $|0\rangle$ 818 and $|1\rangle$ 820, respectively. The state vector $|\psi\rangle$ 814 can be multiplied by an arbitrary complex number with unit modulus, $e^{i\alpha}$, without changing the magnitudes of the squares of the coefficients α and β, as shown by:

$$e^{i\gamma}|\psi\rangle = e^{i\gamma}r_\alpha e^{i\phi_\alpha}|0\rangle + e^{i\gamma}r_\beta e^{i\phi_\beta}|1\rangle,$$

$$|e^{i\gamma}r_\alpha e^{i\phi_\alpha}|^2 = e^{i\gamma}r_\alpha e^{i\phi_\alpha}e^{-i\gamma}r_\alpha e^{-i\phi_\alpha}r_\alpha^2 = |\alpha|$$

$$|e^{i\gamma}r_\beta e^{i\phi_\beta}|^2 = |\beta|^2.$$

Thus, there is a global phase-shift degree of freedom in the expression of a state vector that does not affect the measureable properties associated with the state.

The state vector $|\psi\rangle$ 814 can alternately be expressed, using the Bloch-sphere angles shown in FIG. 8D, as:

$$|\psi\rangle = \cos\frac{\theta}{2}|0\rangle + e^{i\varphi}\sin\frac{\theta}{2}|1\rangle.$$

A derivation of this expression from the previously presented expression $|\psi\rangle = r_\alpha e^{i\phi_\alpha}|0\rangle + r_\beta e^{i\phi_\beta}|1\rangle$, for the state vector $|\psi\rangle$ follows:

$$e^{i\varphi_\alpha}|\psi\rangle = e^{i\varphi_\alpha}r_\alpha e^{i\varphi_\alpha}|0\rangle + e^{i\varphi_\alpha}r_\beta e^{i\varphi_\beta}|1\rangle,$$

$$= r_\alpha|0\rangle + r_\beta e^{i(\varphi_\beta - \varphi_\alpha)}|1\rangle$$

$$= r_\alpha|0\rangle + r_\beta e^{i\varphi}|1\rangle,$$

$$|\psi\rangle = r_\alpha|0\rangle + r_\beta e^{i\varphi}|1\rangle,$$

$$x = r\sin\theta\cos\varphi,$$

$$y = r\sin\theta\sin\varphi,$$

$$z = r\cos\theta,$$

$$r = 1, r_\alpha \to z,$$

$$|\psi\rangle = \cos\theta|0\rangle + e^{i\varphi}\sin\theta|1\rangle,$$

$$\theta' = 2\theta,$$

$$|\psi\rangle = \cos\left(\frac{\theta'}{2}\right)|0\rangle + e^{i\varphi}\sin\left(\frac{\theta'}{2}\right)|1\rangle.$$

The derivation uses a global phase factor to remove a phase coefficient from one of the terms and then employs spherical coordinate representations of the orthonormal axes x, y, and z as well as several substitutions to produce the final expression.

In the current discussion, a qubit is treated as a mathematical object with the above-described properties. However, these mathematically-described qubits correspond to actual physical hardware qubits that can be implemented using a number of different physical implementations, including trapped ions, optical cavities, and individual elementary particles, molecules, or aggregations of molecules that exhibit qubit behavior.

Various different primitive operations, corresponding to logic circuits in a digital computer and to computer instructions that control operation of logic circuits, can be performed on classical bits to produce classical bits with possibly altered state values. These primitive operations are referred to as "gates," e.g., quantum gates 114. (See, FIG. 1.) For example, when a signal corresponding to the state of a first classical bit is passed through a digital NOT gate and stored in a second classical bit, the state of the second classical bit is opposite from the state of the first classical bit. In fact, the digital NOT gate is the only fundamental, non-trivial, traditional, classical computing gate with a single-bit input and a single-bit output. By contrast, there are an infinite number of possible single-qubit quantum gates that change the state vector of a qubit. As can be seen in FIG. 8D, changing the state of a qubit essentially involves changing the direction of the state vector or, in other words, selecting a new direction for the state vector from among an infinite number of directions. Changing the state of a qubit state vector is therefore referred to as a "rotation." A rotation, state change, or single-qubit quantum-gate operation is represented mathematically by a unitary 2×2 matrix with complex elements:

$$\begin{bmatrix} a & -\lambda b^* \\ b & \lambda a^* \end{bmatrix}$$

where the notation "x*" indicates the complex conjugate of x, $|\lambda|=1$ and $|a|^2+|b|^2=1$. A unitary 2×2 matrix X with complex elements can be defined as a 2×2 matrix X with the following property:

$$X^\dagger X = XX^\dagger = I = \begin{bmatrix} 1 & 0 \\ 0 & 1 \end{bmatrix}$$

where $$X^\dagger = \begin{bmatrix} a^* & b^* \\ -\lambda^* b & \lambda^* a \end{bmatrix}.$$

The adjoint $X^\dagger$ of a unitary matrix X is the conjugate transpose of the unitary X. The fact that multiplication of the adjoint unitary operation by the unitary operation, or vice versa, produces the identity operator Id, or identity matrix I, can be seen by:

$$\begin{bmatrix} a^* & b^* \\ -\lambda^* b & \lambda^* a \end{bmatrix} = \begin{bmatrix} a & -\lambda b^* \\ b & \lambda a^* \end{bmatrix}$$

$$= \begin{bmatrix} aa^* + b^*b & -\lambda a^*b^* + \lambda a^*b^* \\ -\lambda^*ab + \lambda^*ab & \lambda\lambda^*aa^* + \lambda\lambda^*b^*b \end{bmatrix}$$

$$= \begin{bmatrix} 1 & 0 \\ 0 & 1 \end{bmatrix}$$

since $$\lambda\lambda^* = |\lambda|^2 = 1 \text{ and } a^*a + bb^* = |a|^2 + |b|^2 = 1.$$

Thus, the operation of a quantum gate on a qubit with state $|\psi\rangle$, where $|\psi\rangle$ is expressed in vector form as $$|\psi\rangle = \begin{bmatrix} \alpha \\ \beta \end{bmatrix},$$

can be expressed as left-hand multiplication of the state vector by the unitary matrix corresponding to the unitary operation:

$$\begin{bmatrix} a & -\lambda b^* \\ b & \lambda a^* \end{bmatrix} \begin{bmatrix} \alpha \\ \beta \end{bmatrix} = \begin{bmatrix} a\alpha - \lambda b^* \beta \\ b\alpha + \lambda a^* \beta \end{bmatrix} = \begin{bmatrix} \alpha' \\ \beta' \end{bmatrix}.$$

Figure 9:
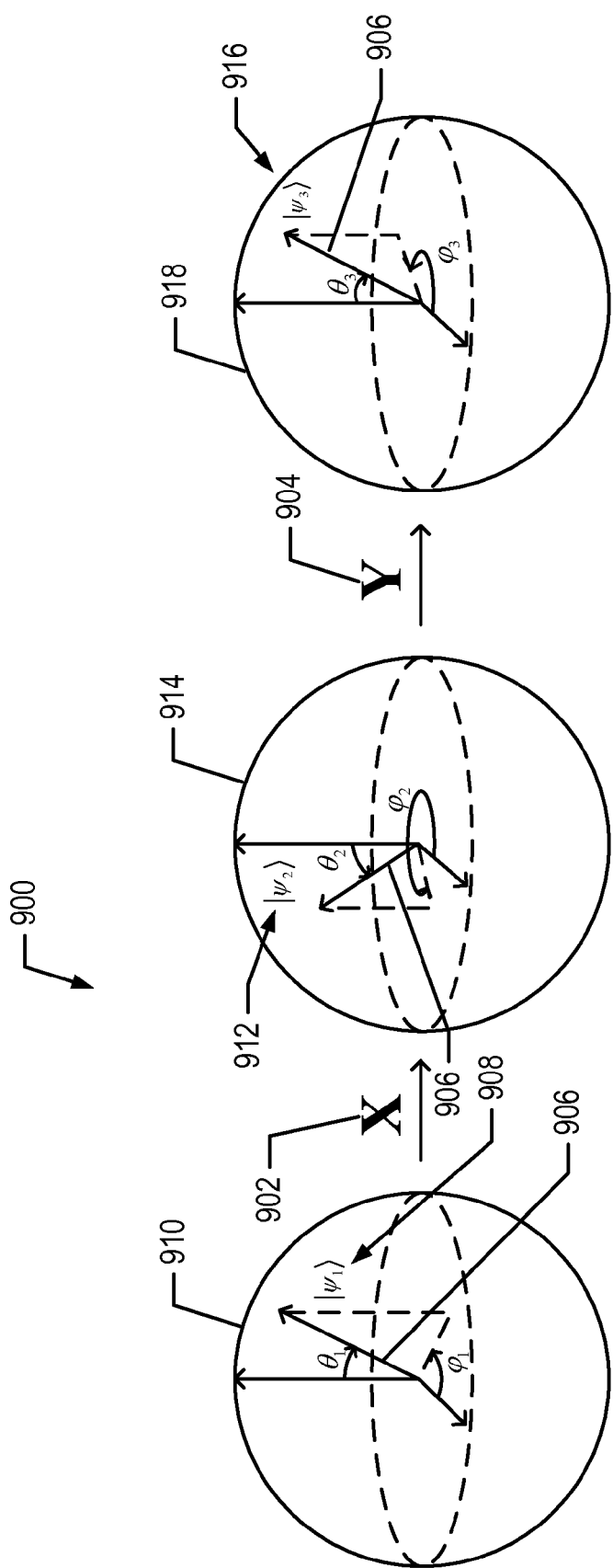
FIG. 9 illustrates an example quantum circuit comprising two exemplary quantum gates.

FIG. 9 illustrates a quantum circuit 900 comprising two quantum gates, unitary operation X 902 and unitary operation Y 904. In FIG. 9, a qubit 906 in a first state $|\psi\rangle$ 908, represented by the Bloch sphere 910, is transformed by the unitary operation X 902 such that the qubit 906 is in a state $|\psi_2\rangle$ 912, as represented by Bloch sphere 914. The second unitary operation Y 904 to places the qubit 906 in a state $|\psi\rangle$ 916, as represented by Bloch sphere 918. This quantum circuit 900 can be represented as the gate sequence XY which transforms the qubit as follows:

$$\begin{matrix} X & |\psi_1\rangle & & & =|\psi_2\rangle \\ \begin{bmatrix} X_{11} & X_{12} \\ X_{21} & X_{22} \end{bmatrix} \begin{bmatrix} \alpha_1 \\ \beta_1 \end{bmatrix} \rightarrow \begin{bmatrix} X_{11}\alpha_1 + X_{12}\beta_1 \\ X_{21}\alpha_1 + X_{22}\beta_1 \end{bmatrix} = \begin{bmatrix} \alpha_2 \\ \beta_2 \end{bmatrix} \end{matrix}$$

$$\begin{matrix} Y & |\psi_2\rangle & & & & =|\psi_3\rangle \\ \begin{bmatrix} Y_{11} & Y_{12} \\ Y_{21} & Y_{22} \end{bmatrix} \begin{bmatrix} \alpha_2 \\ \beta_2 \end{bmatrix} \rightarrow \begin{bmatrix} Y_{11}\alpha_2 + Y_{12}\beta_2 \\ Y_{21}\alpha_2 + Y_{22}\beta_2 \end{bmatrix} = \begin{bmatrix} Y_{11}(X_{11}\alpha_1 + X_{12}\beta_1) + Y_{12}(X_{21}\alpha_1 + X_{22}\beta_1) \\ Y_{21}(X_{11}\alpha_1 + X_{12}\beta_1) + Y_{22}(X_{21}\alpha_1 + X_{22}\beta_1) \end{bmatrix} = \begin{bmatrix} \alpha_3 \\ \beta_3 \end{bmatrix} \end{matrix}$$

Alternatively, one can multiply the two matrices representing operations X and Y together to produce matrix Z, and then left-hand multiply state vector $|\psi\rangle$ by Z to produce the same result:

$$\begin{matrix} X & Y & & Z \\ \begin{bmatrix} X_{11} & X_{12} \\ X_{21} & X_{22} \end{bmatrix} \begin{bmatrix} Y_{11} & Y_{12} \\ Y_{21} & Y_{22} \end{bmatrix} = \begin{bmatrix} X_{11}Y_{11} + X_{12}Y_{21} & X_{11}Y_{12} + X_{12}Y_{22} \\ X_{21}Y_{11} + X_{22}Y_{21} & X_{21}Y_{12} + X_{22}Y_{22} \end{bmatrix} \end{matrix}$$

$$\begin{matrix} Z & |\psi_1\rangle & & =|\psi_3\rangle \\ \begin{bmatrix} X_{11}Y_{11} + X_{12}Y_{21} & X_{11}Y_{12} + X_{12}Y_{22} \\ X_{21}Y_{11} + X_{22}Y_{21} & X_{21}Y_{12} + X_{22}Y_{22} \end{bmatrix} \begin{bmatrix} \alpha_1 \\ \beta_1 \end{bmatrix} = \begin{bmatrix} \alpha_1(X_{11}Y_{11} + X_{12}Y_{21}) + \beta_1(X_{11}Y_{12} + X_{12}Y_{22}) \\ \alpha_1(X_{21}Y_{11} + X_{22}Y_{21}) + \beta_1(X_{21}Y_{12} + X_{22}Y_{22}) \end{bmatrix} = \begin{bmatrix} \alpha_3 \\ \beta_3 \end{bmatrix}. \end{matrix}$$

A quantum circuit can therefore be specified as a sequence of quantum gates in which the quantum gates are symbolically represented or, equivalently, numerically represented. (It should also be noted that a single quantum gate may be specified as a sequence of quantum gates.) There are several ways to look at a quantum circuit. One can, as discussed above, multiply the matrices corresponding to the component quantum gates together in the order specified by the symbol sequence to produce a final, resultant, 2×2 complex matrix that represents the same state change, in a single operation or quantum gate, corresponding to the state change produced by sequential application of the quantum gates specified in the original symbol sequence. A quantum circuit can be viewed as a design for an actual hardware circuit in a quantum computer, where the hardware circuit needs to perform the operation specified by the single-gate representation of the quantum circuit, or can be viewed as a quantum-computing program, in which operations corresponding to the sequence of quantum gates represented by the symbol sequence are applied to a qubit in order to produce a final qubit state.

The term "quantum circuit" is thus somewhat interchangeable with the term "quantum gate," as a quantum circuit can be expressed as a resultant operator. However, symbolically represented quantum circuits are useful in quantum circuit design for many reasons, including the fact that it is quite difficult to design and implement arbitrary physical quantum gates, but far easier to design and implement certain standard quantum gates, several of which are shown below. A symbolic representation using implementable quantum gates can thus represent a feasible design for hardware or a control program that produces the result that would be produced by the quantum-gate resultant obtained by multiplying the sequence of standard quantum gates. In addition, quantum circuits symbolically represented as sequences of standard gates do not necessarily map with uniform density to the set of arbitrary quantum gates, and finding a standard-gate implementation working back from a desired quantum gate is generally not a computationally tractable problem.

V Gate Basis Set and Decomposition Techniques

In the following discussing V basis is a generalization and refers to all $V(p_i)$ bases (e.g., V(5), V(13), etc.).

Given that the V basis is efficiently universal, it is natural to consider constructing efficient decomposition techniques for it. In addition, there have been advances in fault-tolerant implementations of the V gates. A protocol for distillation of non-stabilizer states allows a V gate to be implemented by way of T gates. Alternatively, a V gate may be implemented utilizing the quantum circuit 300 (see FIG. 3) in conjunction with protocols for distilling Toffoli states. Example techniques are discussed in detail below for efficiently compiling quantum circuits into the V basis. In some instances, the number of non-Clifford V gates is minimized due to their high implementation costs.

One first non-limiting example technique approximates single-qubit unitaries over the set consisting of the V basis and the Clifford group. A second non-limiting example technique approximates single-qubit unitaries over the set consisting of the V basis and the Pauli gates. The first technique employs randomization, runs in expected polynomial time and delivers $\epsilon$-approximations with V count ≤12 $\log_5(2/\epsilon)$, where $\epsilon$ is a measure of precision. The second technique employs direct search and produces $\epsilon$-approximations with V count≤3 $\log_5(1/\epsilon)$ for most single-qubit unitaries, and approximations with V count $4\log_5(2/\epsilon)$ for edge cases. The compilation time for the second technique is linear in $1/\epsilon$ and thus exponential in $\log(1/\epsilon)$. However, despite being exponential in $\log(1/\epsilon)$, the second technique may still be utilized to find quantum circuits. For example, in some instances, the second technique has been utilized to find quantum circuits of length L=28 at precision level $\epsilon=3*10^{-7}$ with merely 1 minute of classical CPU time and modest space usage.

In the case of both the {H,T} basis and the V basis, the non-Clifford gates cannot be implemented fault-tolerantly in a purely unitary fashion. State-of-the-art fault-tolerant implementations of T are typically based on state distillation, which involves use of measurement, classical feedback, and ancillae qubits, or in some situations, the fault-tolerant implementations of T may be implemented directly by hardware comprised of quantum circuits. Similarly, existing fault-tolerant implementations of the V gates also involve measurement, classical feedback, and ancillae qubits. In both cases, efficient fault-tolerant methods continue to be developed and optimized. For this reason, the decomposition techniques are "costed" in terms of the number of non-Clifford gates. A fine-grained cost comparison can then be determined based on a chosen fault-tolerant implementation or device architecture.

Preliminaries

Let the set of W circuits be the set of those circuits generated by the V basis and the Pauli matrices I, X, Y, Z. It should be noted that the monoid $\langle W \rangle = \langle X, Y, Z, V1, V2, V3 \rangle \subset SU(2)$ contains all of the $\{V_i^{-1}, i=1, 2, 3\}$ and thus is in fact a subgroup of SU(2) containing $\langle V \rangle$.

It should be further noted that the Pauli operators are a staple of any quantum computing architecture and can be implemented fault tolerantly at a very low resource cost in comparison to a non-Clifford group gate. It is also noted that the single-qubit Clifford group C in combination with any of the six V matrices generates a monoid $\langle C+V \rangle \subset SU(2)$ that is in fact a group, containing (W).

For the purposes of this disclosure, the number of V gates of a quantum circuit is called the V-count of that quantum circuit and is labeled as $V_c$. It can be shown that an irreducible W quantum circuit contains at most one non-identity Pauli gate. Thus, if v is the V-count of such a circuit, then the overall depth of the circuit is either v or v+1.

A quantity called the trace distance is used to measure the distance between two unitaries U, V∈PSU(2) and is given by:

$$\text{dist}(U,V) = \sqrt{1 - |tr(UV^\dagger)|/2}. \quad (1)$$

The trace distance between a target unitary gate and the approximating unitary as precision $\epsilon$.

While it has been shown that any single-qubit unitary can be approximated to a given precision $\epsilon$ by a V circuit of depth $$O\left(\ln\left(\frac{1}{\epsilon}\right)\right),$$

no algorithm for actual synthesis of the approximating/replacement quantum circuits has yet been shown. In the present disclosure, effective techniques for synthesizing W-circuit approximations of single-qubit unitaries are developed.

The techniques may be based on the following theorem:

Theorem 1. A single-qubit unitary gate U can be exactly represented as a W circuit of V count $V_c \leq L$ if and only if it has the form $$U = (aI + biX + ciY + diZ)5^{-L/2}, \quad (2)$$

where a, b, c, d are integers such that $a^2+b^2+c^2+d^2=5^L$.

Theorem 1 follows from Theorem 2 given below, which also gives rise to a simple constructive procedure for synthesizing a W circuit that represents such a U.

The following proof begins by sketching a linear-time technique for exact W-circuit synthesis that employs arithmetic of Lipschitz quaternions. More specifically, consider the group W of quaternions generated by $$\pm 1, \pm i, \pm j, \pm k, 1 \pm 2i, 1 \pm 2j, 1 \pm 2k. \quad (3)$$

Then the following holds:

Theorem 2. (1) W is equal to the set of Lipschitz quaternions with norms $5^L$, ($L \in \mathbb{Z}$, $L \geq 0$). (2) Consider the group $W_1 = \{w/\sqrt{\text{norm}(w)} | w \in W\}$. Then the subgroup of gates in PSU(2) representable as exact W-circuits is isomorphic to the central quotient $W_1/Z(W_1)$ where $Z(W_1) = \mathbb{Z}_2 = \{1, -1\}$.

Proof.(1) Recall that the quaternion norm is multiplicative and that $\pm 1$, $\pm i$, $\pm j$, $\pm k$ are the only Lipschitz quaternions of norm 1. Thus statement (1) is true for L=0.

The following is a proof for L=1: Let q=a+bi+cj+dk, a, b, c, d∈$\mathbb{Z}$ and norm(q)=$a^2+b^2+c^2+d^2=5$, which may be referred to as a unitarity condition.

Decompositions of 5 into sums of squares of four integers are easily enumerated and exactly two of the coefficients in the list {a,b,c,d} are zero, exactly one is $\pm 1$, and exactly one is $\pm 2$.

If $a = \pm 1$, then it is observed that q is equal to one of $1 \pm 2i$, $1 \pm 2j$, $1 \pm 2k$, $-(1 \pm 2i)$, $-(1 \pm 2j)$, $-(1 \pm 2k)$ and thus belongs to W.

If one of b, c, d is $\pm 1$, the proof is reduced to the previous observation by multiplying q times one of i, j, k.

For example, if $c = \pm 1$, then the real part of -jq is equal to $c = \pm 1$.

Consider now a quaternion q with norm(q)=$5^L$, $L \geq 1$.

Let $q = p_1 \ldots p_m$ be a prime quaternion factorization of q. Since $5^L = \text{norm}(q) = \text{norm}(p_1) \ldots \text{norm}(p_m)$, for each i=1, ..., m the norm($p_i$) is either 5 or 1. As shown above (considering L=0, 1), in either case $p_i \in W$.

(2) Effective homomorphism h of $W_1$ onto the W-circuits is the multiplicative completion of the following map:

$i \rightarrow iX$ $j \rightarrow iY$ $k \rightarrow iZ$ $(1 \pm 2i)/\sqrt{5} \rightarrow (1 \pm 2iX)/\sqrt{5}$ $(1 \pm 2j)/\sqrt{5} \rightarrow (1 \pm 2iY)/\sqrt{5}$ $(1 \pm 2k)/\sqrt{5} \rightarrow (1 \pm 2iZ)/\sqrt{5}$ The correctness of this definition of homomorphism h is verified by direct comparison of multiplicative relations between the generators of $W_1$ and g(W)={iX, iY, iZ, $(1 \pm 2iX)/\sqrt{5}$, $(1 \pm 2iY)/\sqrt{5}$, $(1 \pm 2iZ)/\sqrt{5}$}. These relations happen to be identical.

Effective homomorphism h is an epimorphism since all of the generators g(W) of the W-circuits group are by design in its image.

The characterization of Ker(h) is derived from representation of quaternions as orthogonal rotations of the 3-dimensional Euclidean space.

The units i, j, k may be arbitrarily mapped into vectors of an orthonormal basis in the Euclidean space and the corresponding basis vectors are labeled e(i), e(j), e(k). For a quaternion with zero real part p=bi+cj+dk, e(p)=b*e(i)+c*e(j)+d*e(k).

Let $H_1$ be the group of quaternions of norm 1 and g: $H_1 \to SO(3)$ be the representation defined as g(q)[e(b)]=e(q*b*q$^{-1}$).

It is known that g(q) is an orthogonal rotation; g is a representation of the group of quaternions of norm 1 and that the kernel of this representation is the cyclic group $\mathbb{Z}_2 = \{1, -1\}$.

The group of quantum gates PSU(2) also has a standard orthogonal representation stemming from its adjoint representation on the Lie algebra psu(2)=su(2)=so(3). More specifically if psu(2) is regarded as the algebra of zero-trace Hermitian matrices then ad: PSU(2)→Aut(psu(2)), where Aut is the automorphism, is ad(u)[m]=u m u$^{-1}$.

The adjoint representation for PSU(2) is faithful.

If the above homomorphism h is regarded as the homomorphism h: $W_1 \to PSU(2)$ then it is immediate that ad h=g on $W_1$. Since ad is faithful, i.e., injective, the kernel of h coincides with Ker(g)=Z($W_1$)=($\mathbb{Z}$)$_2$={-1,1}. (Q.E.D.)

Lipschitz quaternions form a division ring, and in view of Theorem 2, a quaternion with norm equal to $5^L$ can be decomposed into a product of generators in equation 3 in L trial division steps.

Pseudo code for an example decomposition technique is as follows, with input being a Lipschitz quaternion q of norm $5^L$:

```
(1)   Initialize q and let ret ← empty list
(2)   while norm(q) > 0 do
(3)     find d in {1 ± 2i, 1 ± 2j, 1 ± 2k} such that d divides q
(4)     ret ← {d} + ret
(5)     q ← q/d //divides norm(q) by 5
(6)   end while
(7)   if q ≠ 1 then
(8)     ret ← q + ret
(9)   end if
(10)  return ret
```

Now, given a unitary U as described in Thm 1, it is associated with the quaternion q=a+bi+cj+dk that has norm $5^L$ and thus belongs to the subgroup W. The factorization of q in the basis given in equation 3 is translated into a factorization of U in the W basis. Thus, the approximation of a target unitary gate G by a W quantum circuit is constructively reduced to approximating G with a unitary U described in Thm 1.

Techniques for decomposing single-qubit unitaries into a circuit in the set $\langle \mathcal{C} +V \rangle$, where $\mathcal{C}$ is the set of single-qubit Clifford gates and V is one of the V gates, are discussed below.

Example Approximation/Replacement Quantum Gate Technique

Figure 10:
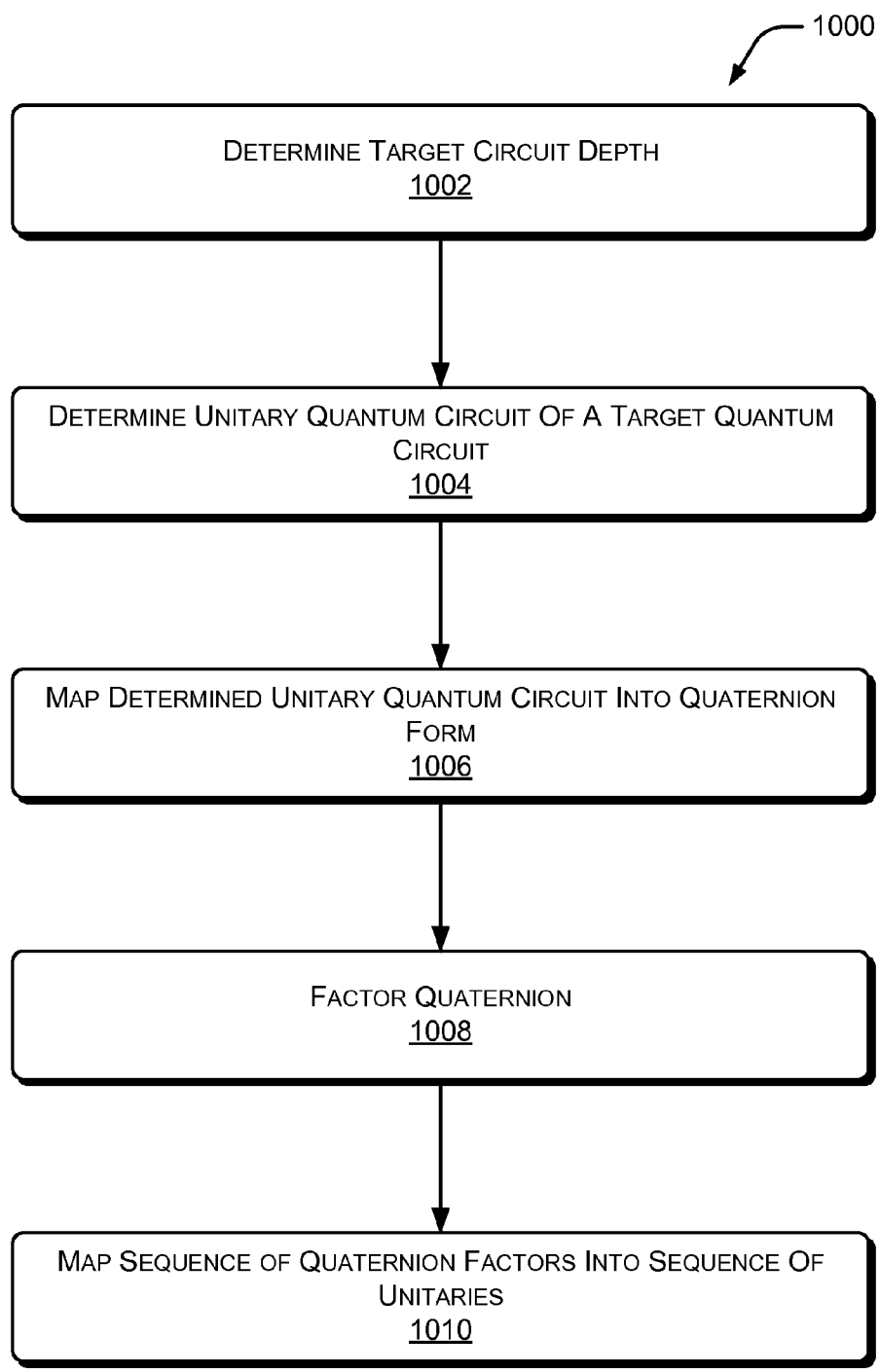
FIG. 10 is a flow diagram of an example process for determining a replacement sequence of universal quantum gates.

FIG. 10 is a flow diagram of an illustrative process 1000 for determining a replacement sequence of universal quantum gates (e.g., V gates). The process 1000 and other processes discussed hereinbelow are, or may be, illustrated as a collection of blocks in a logical flow graph, which represent a sequence of operations that can be implemented in hardware such as, but not limited to, non-quantum computing devices (e.g., digital computers), quantum devices (e.g., quantum computing systems) and/or a combination thereof, software/algorithms for non-quantum computing devices and/or quantum devices, or a combination hardware and software/algorithm(s). In the context of software/algorithms, the blocks represent computer-executable instructions that, when executed by one or more processors, cause the one or more processors to perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process(es).

At 1002, a circuit depth L or precision ϵ is determined.

At 1004, a unitary quantum circuit of a target quantum circuit is determined. The unitary quantum circuit has the predetermined circuit depth L or precision ϵ.

At 1006, the unitary form of the unitary quantum circuit is expressed as or converted into a quaternion form having a specific structure. For example, the following mapping may be utilized to convert back and forth between quaternion form and unitary form for the V(5) basis set.

$$i \to iX$$

$$j \to iY$$

$$k \to iZ$$

$$(1 \pm 2i)/\sqrt{5} \to (1 \pm 2iX)/\sqrt{5}$$

$$(1 \pm 2j)/\sqrt{5} \to (1 \pm 2iY)/\sqrt{5}$$

$$(1 \pm 2k)/\sqrt{5} \to (1 \pm 2iZ)/\sqrt{5}$$

At 1008, the quaternion form is factorized to produce a list/sequence of irreducible quaternions factors. The factorization is determined based at least in part on the predetermined circuit depth L or precision ϵ.

At 1010, each quaternion of the list/sequence of quaternions is then mapped back into a unitary (e.g., a quantum gate of the V(5) basis set) to produce the replacement quantum circuit.

Techniques for determining a unitary quantum circuit of a target quantum gate are provided below. In one embodiment, a randomization technique is employed to decompose single-qubit unitaries into a circuit in the set $\langle \mathbb{Z} +V \rangle$, where $\mathbb{Z}$ is the set of single-qubit Clifford gates and V is one of the V gates. In another embodiment, a direct search technique is employed to single-qubit unitaries into a circuit in the set $\langle \mathcal{P} +V \rangle$, where $\mathcal{P}$ is the set of single-qubit Pauli gates and V is one of the V gates.

Randomization Approximation Technique

The following technique is based on a conjecture. The conjecture is presented for a general prime p=1 mod 4. However, the techniques discussed herein may, in some instances, be applied for p=5, and in such instances, the conjecture to be true only for p=5.

Conjecture 1 Consider N=$p^L$, where p is a fixed integer prime number with p=1 mod 4 and L is a large even integer. For a constant Δ>1, let the four-square decomposition set $s_4(N)$, the geometric ring R(N, Δ), and the circular segment A(N, Δ, $P_+$) be defined as above. Let $Pr_{x,y}(s_4(N))$ be the projection of the $s_4(N)$ onto its first two coordinates. Then $$card(Pr_{x,y}(s_4(N)) \cap R(N,\Delta)) = \Omega(p^{L/2}/\sqrt{L}) \quad (1)$$

and $$card(Pr_{x,y}(s_4(N)) \cap A(N,\Delta,P_+)) = \Omega(p^{L/4}/\sqrt{L}) \quad (2)$$

The technique begins by approximating an arbitrary Z-rotation with a $\langle \mathcal{C}+V \rangle$ quantum circuit. The following technique works well in practice for $\epsilon < 2*5^{-4} = 0.0032$.

Problem 1 Given a Z-rotation $G = R_Z(\theta)$ and a small enough target precision $\epsilon$, synthesize a $\langle \mathcal{C}+V \rangle$ circuit $c(G, \epsilon)$ such that $$\text{dist}(c(G, \epsilon) < \epsilon \quad (4)$$

and $$V_c(c(G, \epsilon))) \leq 4 \log_5(2/\epsilon)). \quad (5)$$

Theorem 3 There exists a randomized algorithm that solves Problem 1 in expected time polynomial in $\log(1/\epsilon)$.

Geometry that relates Thm 3 to Conjecture 1 for p=5 is presented below. The goal is to select the target circuit depth value L such that $$\epsilon < 2 * 5^{-L/4}. \quad (6)$$

Having found the smallest integer L satisfying equation 6, G is represented as $$G = \cos\left(\frac{\theta}{2}\right) I + i\sin\left(\frac{\theta}{2}\right) Z$$

and G is approximated with $U = (aI + biX + ciY + diZ)5^{-L/2}$, as suggested by Thm 1.

Approximating G to precision $\epsilon$ in the trace distance metric is equivalent to finding U such that $$\left(a\cos\left(\frac{\theta}{2}\right) + d\sin\left(\frac{\theta}{2}\right)\right) 5^{-L/2} > 1 - \epsilon^2.$$

Without loss of generality, it suffices to prove the theorem for $-\pi/2 < \theta < \pi/2$ since the target gate can be rotated to a position within this interval using $R_Z(\pm\pi/2)$ rotations from the Clifford group. Further, the selection of L ensures that $5^{L/4} \epsilon \sim 2$.

Denote by $A_\epsilon(\theta)$ the segment of the unit disk where $$\left(x\cos\left(\frac{\theta}{2}\right) + y\sin\left(\frac{\theta}{2}\right)\right) > 1 - \epsilon^2.$$

Let D(L) be an isotropic dilation of the plane with coefficient $5^{L/2}$. Then the area of $D(L)[A_\epsilon(\theta)]$ is $$\mathcal{A}(D(L)[A_\epsilon(\theta)]) = 5^L \frac{4\sqrt{2}}{3} \epsilon^3 \sim 8 \frac{4\sqrt{2}}{3} 5^{L/4}.$$

Define the angle $\phi = \sqrt{2}\epsilon(1 - \epsilon^2/4)$ and the interval $$I_w(\epsilon, \theta) = \left(5^{L/2}\sin\frac{\theta}{2} - \phi, 5L/2\sin\theta 2 + \phi\right)$$

with subinterval 5L/2 sin θ2−ε,5L/2 sin θ2+ε.

The length of the latter is approximately $$2 * 5^{L/2} \cos\left(\frac{\theta}{2}\right) \epsilon \geq 2\sqrt{2} * 5^{L/4}$$

and it contains approximately at least as many integer values.

Given any integer a such that $$5^{L/2}\sin\left(\frac{\theta}{2} - \epsilon\right) < a < 5^{L/2}\sin\left(\frac{\theta}{2} + \epsilon\right),$$

it can be geometrically derived that the intersection of the horizontal line w=a with $D(L)[A_\epsilon(\theta)]$ is a straight line segment that is longer than $$5^{L/2} \frac{\epsilon^2}{2} \geq 2$$

and that it contains at least two integer grid points.

The theorem may now be proved.

Proof. As discussed above, the set of all representations of $5^L$ is a sum of squares of four integers $s_4(5^L) = \{(x, y, z, w) \in \mathbb{Z}^4 | x^2 + y^2 + z^2 + w^2 = 5^L\}$.

The key step in this proof is finding a point (a, d) in the intersection of $\text{Pr}_{x,y}(s_4(5^L))$ and $D(L)[A_\epsilon(\theta)]$. Once such a point is found, a Rabin-Shallit algorithm may be used to express $5^L - a^2 - d^2$ as $b^2 + c^2$, $b, c \in \mathbb{Z}$. Then $U = (aI + biX + ciY + diZ)5^{-L/2}$ would be the desired approximation of G, and can be represented precisely as a W circuit in at most L quaternion division steps.

Consider a horizontal line $w = \alpha$, where $\alpha \in I_w(\epsilon, \theta)$. By geometric calculation it is found that the intersection of this line with the $D(L)[A_\epsilon(\theta)]$ segment is a line segment that is at most $$5^{L/2}\epsilon^2 \big/ \cos\left(\frac{\theta}{2}\right) \leq 5^{L/2}\sqrt{2}\,\epsilon^2$$

long.

For this choice of L this maximum length is approximately $4\sqrt{2}$ and thus the line segment contains at most 5 points with an integer first coordinate. On the other hand, it was shown earlier that for $$5^{L/2}\sin\left(\frac{\theta}{2} - \epsilon\right) < a < 5^{L/2}\sin\left(\frac{\theta}{2} + \epsilon\right)$$

the intersection of the w=a line with $D(L)[A_\epsilon(\theta)]$ is a line segment that is longer than 2 and must contain at least 2 points with integer z coordinate. In other words, if $a \in I_w(\epsilon, \theta)$ is a randomly selected integer, then with probability at least $1/\sqrt{2}$ the intersection segment contains at least 2 integer grid points.

The following pseudo code provides an example randomized approximation technique:

(1) Input precision ε, angle θ
(2) let completion ← null
(3)    let Sw ← set of all integers in $I_w(\epsilon, \theta)$
(4)    while completion == null and Sw ≠ 0 do -continued

```
(5)     Randomly, pick an integer a from Sw
(6)     Sw ← Sw − {a}
(7)     For all integer d such that (d,a) ∈ D(L)[A_ε(θ)] do
(8)       if exist b,c ∈ ℤ
(9)         such that $5^L − a^2 − d^2 = b^2 + c^2$ then
(10)          completion ← (b,c)
(11)          Break;
(12)        end if
(13)      end for
(14)    end while
(15)    if completion == null then
(16)      return null;
(17)    end if
(18)    b ← first(completion)
(19)    c ← last(completion)
(20)    return U = (a I + b i X + c i Y + d i Z)$5^{−L/2}$
```

In the worst case the pseudo code terminates by exhausting the $\Theta(5^{L/4})$ candidate points in the $D(L)[A_\epsilon(\theta)]$ segment. However, it is noted that this segment is that of Conjecture 1 when p=5. Therefore the share of satisfactory candidates among all of the integer grid points $D(L)[A_\epsilon(\theta)]$ is $\Omega(1/\sqrt{L})$. Thus the pseudo code will terminate in $O(\sqrt{L})$ iterations on average.

Since the average overall number of iterations is moderate, the largest cost in the pseudo code is line 8. It has been shown that the effective test for an integer v to be a sum of squares of two integers has expected running cost of $O(\log^2(v)\log(\log(v)))$. In the present example $v \leq 8*5^{L/2}$ and it is estimated the expected cost of the step as $O(L^2 \log(L))$. Therefore the overall expected cost of the algorithm is $O(L^{5/2} \log(L))$ which translates into $O(\log(1/\epsilon)^{5/2} \log(\log(1/\epsilon)))$.

One can say that the above pseudo code is solving a norm equation in line 8, however this is a norm equation over the simple domain of Gaussian integers and happens to nicely coincide with the well-studied classical problem of decomposing an integer into a sum of two squares.

Empirical Tightening of the Randomized Approximation Technique

As will be discussed below, most, although not all, single-qubit target gates allow approximating circuits with V count $V_c \leq 3 \log_5(1/\epsilon)$ for small enough target precision $\epsilon$. Thus the resource count $V_c = \log_5(1/\epsilon)$ guaranteed by the above pseudo code for the example randomized approximation technique is too loose in most cases, including in the case of most axial rotations. In some embodiments, the above pseudo code may be tightened by setting $L=[c \log_5(1/\epsilon)]$, $c<4$ in an attempt to find a suitable completion candidate following the same randomized search loop as described above.

c may be iterated from c=3 to c=3.9 with a suitable step size $\delta_c$. Since polynomial-time termination of the randomized search loop is no longer supported by Conjecture 1, an arbitrary time limit may be set on the search loop for each iteration. The results of this technique on a test set of 1000 random rotations at 6 values of $\epsilon$ indicate that the minimal successful coefficient c satisfies 3.5<c<4, with the average successful c estimated at 3.7. The R gate 204 (see FIG. 2) was determined by the above technique, with c=3.7.

Alternative Basis Set

A foundation for efficient circuit synthesis over the V basis is the set of quaternions of norm $5^L$ and a body of number theory facts and conjectures related to that set. Given an integer prime p such that p=1 mod 4, it is apparent that most of these facts and observations generalize to quaternions of norm $p^L$, which are generated by the primitive ones of norm p. Modulo Lipschitz units there are p+1 such quaternions in the generator set. These correspond to a basis of p+1 unitary operators that we denote V'(p). Together with the Pauli gates a subset of (p+1)/2 of the V'(p) operators generate the generalization of the W circuits.

However, in the case of p=5, it was sufficient to add only one V operator in order to ensure the asymptotic uniformity of the grid of $\langle \mathcal{C} + \{V\} \rangle$ circuits. For p >5, additional independent V(p) operators are required.

$V_1(13) = (2I+3iZ)/\sqrt{13}, V_1^\dagger(13) = (2I-3iZ)/\sqrt{13}$, $V_2(13) = (I+2i(X+Y+Z))/\sqrt{13}, V_2^\dagger(13) = (I-2i(X+Y+Z))/\sqrt{13}$, $V_3(13) = (2I+iX+2i(Y+Z))/\sqrt{13}, V_3^\dagger(13) = (2I-iX-2i(Y+Z))/\sqrt{13}$, $V_4(13) = (2I+iY+2i(X+Z))/\sqrt{13}, V_4^\dagger(13) = (2I-iY-2i(X+Z))/\sqrt{13}$, $V_5(13) = (2I+iZ+2i(X+Y))/\sqrt{13}, V_5^\dagger(13) = (2I-iZ-2i(X+Y))/\sqrt{13}$.

A generalization of Thm 2 characterizes the gates representable exactly in the $\langle \mathcal{C} + \{V'(p)\} \rangle$ basis as normalizations of Lipschitz quaternions of norm $p^L$, $L \in \mathbb{Z}$. The exact synthesis of the corresponding circuit for a unitary of the form $U=(aI+biX+ciY+diZ)/p^{L/2}$ amounts to a generalization of Algorithm 2 and requires at most (p+1)*L quaternion divisions.

Thm 3 also generalizes to $\langle \mathcal{C} + \{V'(p)\} \rangle$ circuits, to the extent that Conjecture 1 holds for the prime parameter p, and the circuit depth estimate from the theorem generalizes to an estimate of the form $L \leq 4 \log_p(2/\epsilon)$.

The V(5) basis set was focused on for at least the reason that the basis requires only one non-Clifford gate for which there is a fault-tolerant implementation protocol.

Direct Search Approximation Technique

Discussed below is a direct search technique for decomposing single-qubit unitaries into a circuit in the set $\langle \mathcal{P} + V \rangle$, where $\mathcal{P}$ is the set of single-qubit Pauli gates and V is one of the V gates.

Problem 2 Given an arbitrary single-qubit unitary G ∈ PSU(2) and a small enough target precision target precision $\epsilon$, synthesize a W circuit $c(G, \epsilon)$ such that $$\text{dist}(c(G,\epsilon),G) < \epsilon \quad (7)$$

and the V count of the resulting circuit is $$V_c \leq 3 \log_5(1/\epsilon) \quad (8)$$

for the majority of target unitaries and $$V_c \leq 4 \log_5(2/\epsilon) \quad (9)$$

in edge cases.

Let L be the intended V count of the desired approximation circuit. Given a target single-qubit unitary gate represented as $G=\alpha I+\beta iX+\gamma iY+\delta iZ$, in order to find integers (a, b, c, d) such that $a^2+b^2+c^2+d^2=5^L$ and $$\text{dist}(G,(aI+biX+ciY+diZ)5^{-L/2}) < \epsilon, \quad (10)$$

the $\alpha,\beta,\gamma,\delta$ coordinates are split into two-variable blocks. Assume that the split is given by $(\alpha,\delta),(\beta,\gamma)$. For the approximation inequality in equation 10 to hold it is sufficient that $$(b5^{-L/2}-\beta)^2+(c5^{-L/2}-\gamma)^2 < \epsilon^2 \quad (11)$$

and $$(a5^{-L/2}-\alpha)^2+(d5^{-L/2}-\delta)^2 < \epsilon^2. \quad (12)$$

In some instances, a precision of $\epsilon=5^{-L/3}$ may be achieved. It can be shown that there are approximately $\pi 5^{L/3}$ integer pairs satisfying each of the conditions in equation 11 and equation 12 for that $\epsilon$. All of the (b,c) integer pairs may be swept over and a hash table of all of the $5^L - b^2 - c^2$ differences occurring in the first set may be built. Then, all of the (a,d) integer pairs from the second set may be swept over, in search of one for which $a^2 + d^2$ occurs in the hash table.

Using number-theoretical considerations, the number of candidates considered in this direct search can be reduced by a factor of approximately $$\frac{LR}{2\sqrt{L\ln(5)}}$$

(where LR is the Landau-Ramanujan constant). Thus, for L=34 the reduction factor is approximately 0.05.

For target unitaries that cannot be approximated to precision $5^{-L/3}$, the technique may iteratively triple the precision goal (which has an effect of expanding the search space at each iteration) until a satisfactory candidate is found.

Pseudo code for an example direct search technique with inputs of precision $\epsilon$ and target gate $G = \alpha I + \beta iX + \gamma iY + \delta iZ$ is as follows:

```
(1)  L ← ⌈3*log₅(1/ε)⌉
(2)  hash ← Dictionary⟨Integer,(Integer * Integer)⟩
(3)  bound± ← 5^L (√(α² + δ²) ± ε)²
(4)  for all b,c ∈ ℤ satisfying equation (11) do
(5)      if bound-≤ 5^L − b² − c² ≤bound+ 5^L − b² − c² is decomposable
             into two squares then
(6)          Add (5^L − b² − c²,(b,c)) →hash
(7)      end if
(8)  end for
(9)  completion ← fail
(10) for all integer pairs (a,d) satisfying equation (12) do
(11)     if hash contains key equal to a² + d² then
(12)         completion ← (a,b,c,d)
(13)         Break;
(14)     end if
(15) end for
(16) if completion ≠ fail then
(17)     completion ← completion. (I,i X,i Y,i Z)5^(−L/2)
(18) end if
(19) return completion
```

Conclusion

The above-described techniques generally pertain to quantum devices, quantum algorithms, and simulations of quantum systems on non-quantum devices such as digital computers. Although the techniques have been described in language specific to structural features and/or methodological acts, it is to be understood that the appended claims are not necessarily limited to the specific features or acts described. Rather, the specific features and acts are disclosed as exemplary forms of implementing such techniques.

The invention claimed is:

1. A method for performing quantum calculations, the method comprising:
   mapping a unitary corresponding to a target quantum gate to a quaternion;
   factoring the quaternion into a sequence of irreducible quaternion factors;
   mapping the sequence of irreducible quaternion factors into a sequence of quantum gates of a universal basis set; and
   applying the sequence of quantum gates to a target qubit.

2. The method of claim 1, further comprising:
   determining an amount of precision between the sequence of quantum gates and the target quantum gate; and
   expressing the unitary as a linear combination of elemental gates of the set of universal basis gates, wherein coefficients of the linear combination of elemental gates are a function of the amount of precision.

3. The method of claim 2, wherein the coefficients of the linear combination of elemental gates includes a first coefficient and other coefficients, the method further comprising:
   randomly picking a value of the first coefficient; and
   determining whether values of the other coefficients exist subject to a constraint imposed by a unitarity condition for the coefficients of the linear combination of elemental gates.

4. The method of claim 2, further comprising:
   directly searching for values of the coefficients of the linear combination of elemental gates that exist subject to a constraint imposed by the amount of precision.

5. The method of claim 4, wherein the coefficients of the linear combination of elemental gates includes a first pair of coefficients and a second pair of coefficients, and wherein directly searching for values of the coefficients of the linear combination of elemental gates further comprises:
   sweeping over pairs of integer values for the first pair of coefficients;
   building a hash table based at least in part on a constraint imposed by the amount of precision and the swept over pairs of integer values; and
   for multiple candidate pairs of integer values, sweeping over the hash table for a specific value corresponding to a respective candidate pair of integer values, wherein the respective candidate pair of integer values are the second pair of coefficients subject to the specific value being in the hash table.

6. The method of claim 5, wherein the respective candidate pair of integer values is comprised of a first integer and a second integer, and wherein the specific value corresponding to the respective candidate pair of integer values is equal to a sum of the first integer squared and the second integer squared.

7. The method of claim 5, wherein building the hash table based at least in part on the constraint imposed by the amount of precision and the swept over pairs of integer values comprises, for each swept over pair of integers,
   determining a sum of squares of integers in the pair of integers;
   determining a difference between the sum of squares and parameter that is a function of the amount of precision; and
   including the difference in the hash table.

8. The method of claim 1, further comprising:
   storing the sequence of quantum gates of the universal basis set in a storage device.

9. A quantum circuit comprising:
   a sequence of quantum gates of a universal basis set that correspond to a target quantum gate, wherein the sequence of quantum gates is made by a process comprising:
   mapping a unitary corresponding to the target quantum gate to a quaternion;
   factoring the quaternion into a sequence of irreducible quaternion factors; and
   mapping the sequence of irreducible quaternion factors into the sequence of quantum gates of the universal basis set.

10. The quantum circuit of claim 9, wherein the process further comprises:
determining an amount of precision between the sequence of quantum gates and the target quantum gate; and
expressing the unitary as a linear combination of elemental gates of the set of universal basis gates, wherein coefficients of the linear combination of elemental gates are a function of the amount of precision.

11. The quantum circuit of claim 10, wherein the coefficients of the linear combination of elemental gates include a first coefficient and other coefficients, and wherein the process further comprises:
randomly picking a value of the first coefficient; and
determining whether values of the other coefficients exist subject to a constraint imposed by a unitarity condition for the coefficients of the linear combination of elemental gates.

12. The quantum circuit of claim 10, wherein the process further comprises:
directly searching for values of the coefficients of the linear combination of elemental gates that exist subject to a constraint imposed by the amount of precision.

13. The quantum circuit of claim 12, wherein the coefficients of the linear combination of elemental gates includes a first pair of coefficients and a second pair of coefficients, and wherein directly searching for values of the coefficients of the linear combination of elemental gates further comprises:
sweeping over pairs of integer values for the first pair of coefficients;
building a hash table based at least in part on a constraint imposed by the amount of precision and the swept over pairs of integer values; and
for multiple candidate pairs of integer values, sweeping over the hash table for a specific value corresponding to a respective candidate pair of integer values, wherein the respective candidate pair of integer values are the second pair of coefficients subject to subject to the specific value being in the hash table.

14. The quantum circuit of claim 13, wherein the respective candidate pair of integer values is comprised of a first integer and a second integer, and wherein the specific value corresponding to the respective candidate pair of integer values is equal to a sum of the first integer squared and the second integer squared.

15. The quantum circuit of claim 13, wherein building the hash table based at least in part on the constraint imposed by the amount of precision and the swept over pairs of integer values comprises, for each swept over pair of integers,
determining a sum of squares of integers in the pair of integers;
determining a difference between the sum of squares and parameter that is a function of the amount of precision; and
including the difference in the hash table.

16. A system for quantum-circuit design comprising:
a processor;
a computer readable storage device storing instructions, wherein the instructions, when executed by the processor, cause the processor to perform acts comprising,
mapping a unitary corresponding to a target quantum gate to a quaternion;
factoring the quaternion into a sequence of irreducible quaternion factors;
mapping the sequence of quaternion factors into a sequence of quantum gates of a universal basis set; and
storing the sequence of quantum gates into the computer-readable storage device.

17. The system of claim 16, wherein acts performed by the processor further include:
determining an amount of precision between the sequence of quantum gates and the target quantum circuit; and
expressing the unitary as a linear combination of elemental gates of the set of universal basis gates, wherein coefficients of the linear combination of elemental gates are a function of the amount of precision.

18. The system of claim 17, wherein the coefficients of the linear combination of elemental gates includes a first coefficient and other coefficients, the method further comprising:
randomly picking a value of the first coefficient; and
determining whether values of the other coefficients exist subject to a constraint imposed by a unitarity condition for the coefficients of the linear combination of elemental gates.

19. The system of claim 17, further comprising:
directly searching for values of the coefficients of the linear combination of elemental gates that exist subject to a constraint imposed by the amount of precision.

20. The system of claim 19, wherein the coefficients of the linear combination of elemental gates includes a first pair of coefficients and a second pair of coefficients, and wherein directly searching for values of the coefficients of the linear combination of elemental gates further comprises:
sweeping over pairs of integer values for the first pair of coefficients;
building a hash table based at least in part on a constraint imposed by the amount of precision and the swept over pairs of integer values; and
for multiple candidate pairs of integer values, sweeping over the hash table for a specific value corresponding to a respective candidate pair of integer values, wherein the respective candidate pair of integer values are the second pair of coefficients subject to subject to the specific value being in the hash table.

* * * * *